(12) United States Patent
Aono et al.

(10) Patent No.: US 11,431,972 B2
(45) Date of Patent: Aug. 30, 2022

(54) IMAGE ENCODING DEVICE, ENCODED STREAM EXTRACTION DEVICE, AND IMAGE DECODING DEVICE

(71) Applicants: SHARP KABUSHIKI KAISHA, Sakai (JP); FG Innovation Company Limited, Tuen Mun (HK)

(72) Inventors: Tomoko Aono, Sakai (JP); Takeshi Chujoh, Sakai (JP); Tomohiro Ikai, Sakai (JP); Yukinobu Yasugi, Sakai (JP)

(73) Assignees: SHARP KABUSHIKI KAISHA, Sakai (JP); FG Innovation Company Limited, Tuen Mun (HK)

(*) Notice: Subject to any disclaimer, the term of this patent is extended or adjusted under 35 U.S.C. 154(b) by 0 days.

(21) Appl. No.: 17/055,338

(22) PCT Filed: May 13, 2019

(86) PCT No.: PCT/JP2019/018973
§ 371 (c)(1),
(2) Date: Nov. 13, 2020

(87) PCT Pub. No.: WO2019/221072
PCT Pub. Date: Nov. 21, 2019

(65) Prior Publication Data
US 2021/0112246 A1   Apr. 15, 2021

(30) Foreign Application Priority Data

May 15, 2018 (JP) .............. JP2018-094031

(51) Int. Cl.
 H04N 19/119 (2014.01)
 H04N 19/167 (2014.01)
(Continued)

(52) U.S. Cl.
CPC ......... *H04N 19/119* (2014.11); *H04N 19/167* (2014.11); *H04N 19/172* (2014.11);
(Continued)

(58) Field of Classification Search
CPC .................. H04N 19/119; H04N 19/167
See application file for complete search history.

(56) References Cited

U.S. PATENT DOCUMENTS

2014/0092963 A1* 4/2014 Wang ............... H04N 19/50
375/240.12
2014/0362919 A1 12/2014 Zhou et al.
(Continued)

FOREIGN PATENT DOCUMENTS

| JP | 2014-11634 A | 1/2014 |
| WO | 2003/047266 A1 | 6/2003 |
| WO | 2018/221368 A1 | 12/2018 |

OTHER PUBLICATIONS

Minhua Zhou, "AHG4: Enable parallel decoding with tiles", JCTVC-I0118, Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012.
(Continued)

*Primary Examiner* — Jerry T Jean Baptiste
(74) *Attorney, Agent, or Firm* — ScienBiziP, P.C.

(57) ABSTRACT

An image coding apparatus includes a coded data generating unit configured to generate coded data including image data for a subpicture acquired by dividing a picture, where the coded data generating unit generates, on a per subpicture basis, a subpicture header including subpicture identification information used for identifying the subpicture, and causes the generated subpicture header to be included in the coded data.

11 Claims, 19 Drawing Sheets

(51) Int. Cl.
  *H04N 19/172* (2014.01)
  *H04N 19/174* (2014.01)
  *H04N 19/70* (2014.01)
  *H04N 19/96* (2014.01)

(52) U.S. Cl.
  CPC ........... *H04N 19/174* (2014.11); *H04N 19/70* (2014.11); *H04N 19/96* (2014.11)

(56) References Cited

U.S. PATENT DOCUMENTS

| | | | |
|---|---|---|---|
| 2015/0172693 A1* | 6/2015 | Yang | H04N 19/17 375/240.26 |
| 2018/0048903 A1 | 2/2018 | Maeda et al. | |
| 2019/0141323 A1* | 5/2019 | Yang | H04N 19/44 |

OTHER PUBLICATIONS

Kiran Misra, Andrew Segall, "New results for parallel decoding for Tiles", JCTVC-F594, Joint Collaborative Team on Video Coding (JCT-VC) of ITU-T SG16 WP3 and ISO/IEC JTC1/SC29/WG11, 6th Meeting: Torino, IT, Jul. 14-22, 2011.

Interdigital Communications, Inc."AHG12:On top-to-bottom tile partitioning" Joint Video Experts Team(JVET) of ITU-T SG 16 WP 3 and ISO/IEC JTC 1/SC 29/WG 11 14th Meeting:Geneva,CH, Mar. 19-27, 2019 JVET-N0066, p. 5,paragraph 3.2-p. 6,paragraph 3.3.

Tencent,"AHG12:On sub-picture partitioning" Joint Video Experts Team(JVET) of ITU-T SG 16 WP 3 and ISO/IEC JTC 1/SC 29/WG 11 14th Meeting:Geneva,CH,Mar. 19-27, 2019 JVET-N0055,Table straddling pp. 5 and 6;p. 4,paragraph 3-p. 6;figure 3.

* cited by examiner

CODING STREAM Te' OF PICTURE 3

| SPS | PPS | SPPS3 | SPH3 | SPICT3 | SPH7 | SPICT7 |
|-----|-----|-------|------|--------|------|--------|

FIG. 11

IMAGE ENCODING DEVICE, ENCODED STREAM EXTRACTION DEVICE, AND IMAGE DECODING DEVICE

FIELD

Embodiments of the present invention are related to an image coding apparatus, a coding stream extraction apparatus, and an image decoding apparatus.

BACKGROUND

In order to efficiently transmit or record video, a video coding apparatus that generates coded data by encoding the video and a video decoding apparatus that generates a decoded image by decoding the coded data are used.

Specific video encoding systems, such as systems proposed by H.264/AVC, High-Efficiency Video Coding (HEVC), and the like are proposed.

In such video encoding system, an image (picture) configuring video is managed using a hierarchical structure formed from slices acquired by dividing the image, coding tree units (CTUs) acquired by dividing a slice, coding units (CUs) acquired by dividing a coding tree unit, prediction units (PUs) that are blocks acquired by dividing a coding unit, and transform units (TUs), and the image is encoded/decoded for each CU.

In such video encoding system, a prediction image is generated based on a locally decoded image acquired by encoding/decoding an input image, and a prediction residue (also referred to as a "differential image" or a "residual image") acquired by subtracting the prediction image from the input image (original image) is encoded. As methods for generating a prediction image, there are an inter-screen prediction (inter prediction) method and an intra-screen prediction (intra prediction) method.

In addition, recent video encoding and decoding technologies include those disclosed in Patent Literature 1 and Non-Patent Literature 1. In Patent Literature 1, a technology of independently encoding each tile in a time direction is disclosed. In Non-Patent Literature 1, a technology relating to tiles of H.265/HEVC and the like is disclosed.

CITATION LIST

Patent Literature

Patent Literature 1: JP 6241504 B (issued on Dec. 6, 2016)

Non-Patent Literature

Non-Patent Literature 1: ITU-T H. 265, "High efficiency video coding," SERIES H: AUDIOVISUAL and MULTIMEDIA SYSTEMS Infrastructure of audiovisual services— Coding of moving video, ISO/IEC 23008-2, December 2016

SUMMARY OF INVENTION

Technical Problem

However, in the technologies of the related art as disclosed in Patent Literature 1 and Non-Patent Literature 1, in a case that coded data of only a specific area is to be generated by extracting a part from coded data of an entire image for displaying only the specific area of a picture, there may be a need to extensively rewrite coded data of slice data and the like. In addition, only one picture (view) can be associated with coded data, and a specific picture (only a view) cannot be extracted and decoded from a coded picture.

The present invention is related to a device that decodes a picture using coded data corresponding to a partial area that can be easily extracted from coded data of an entire picture. In addition, the present invention is related to a device that encodes coded data of an entire picture from which coded data corresponding to a partial area can be extracted. Furthermore, the present invention is related to a stream extraction device that extracts coded data corresponding to a specific area from coded data that can be easily extracted.

Solution to Problem

In order to solve the above-disclosed problem, according to one aspect of the present invention, there is provided an image coding apparatus including: a coded data generating unit configured to generate the coded data including image data for a subpicture acquired by dividing a picture, in which the coded data generating unit generates, on a per subpicture basis, a subpicture header including subpicture identification information used for identifying the subpicture, and includes the generated subpicture header in the coded data.

In order to solve the above-disclosed problem, according to one aspect of the present invention, there is provided a coding stream extraction apparatus that generates output coded data from input coded data, the coding stream extraction apparatus including: an encoding unit configured to generate the output coded data, in which the input coded data includes image data for a subpicture acquired by dividing a picture and a subpicture header that includes subpicture identification information used for identifying the subpicture, the subpicture header being generated on a per subpicture basis, and the encoding unit generates the output coded data including a subpicture parameter set including one or a plurality of pieces of subpicture identification information, and image data for the subpicture.

In order to solve the above-disclosed problem, according to one aspect of the present invention, there is provided an image decoding apparatus that decodes coded data, the image decoding apparatus including: a decoding unit configured to generate a decoded image by decoding the coded data, in which the coded data includes image data for a subpicture acquired by dividing a picture, a subpicture header that includes subpicture identification information used for identifying the subpicture, subpicture header being generated on a per subpicture basis, and a subpicture parameter set including one or more pieces of subpicture identification information, and the decoding unit generates a decoded image by referring to the subpicture parameter set and the subpicture header included in the coded data.

Advantageous Effects of Invention

According to the present invention, coded data corresponding to a partial area from coded data of an entire picture can be easily generated without rewriting slice data. In addition, coded data corresponding to a partial area that has been easily generated can be decoded.

BRIEF DESCRIPTION OF DRAWINGS

FIG. 11 is a diagram illustrating a coding stream generated by a coding stream extraction apparatus according to an embodiment of the present invention.

FIG. 14(a) illustrates the transmitting apparatus equipped with the image coding apparatus, and FIG. 14(b) illustrates the receiving apparatus equipped with the image decoding apparatus.

FIG. 15(a) illustrates the recording apparatus equipped with the image coding apparatus, and FIG. 15(b) illustrates the reconstruction apparatus equipped with the image decoding apparatus.

DESCRIPTION

Image Transmission System 1

Figure 16:
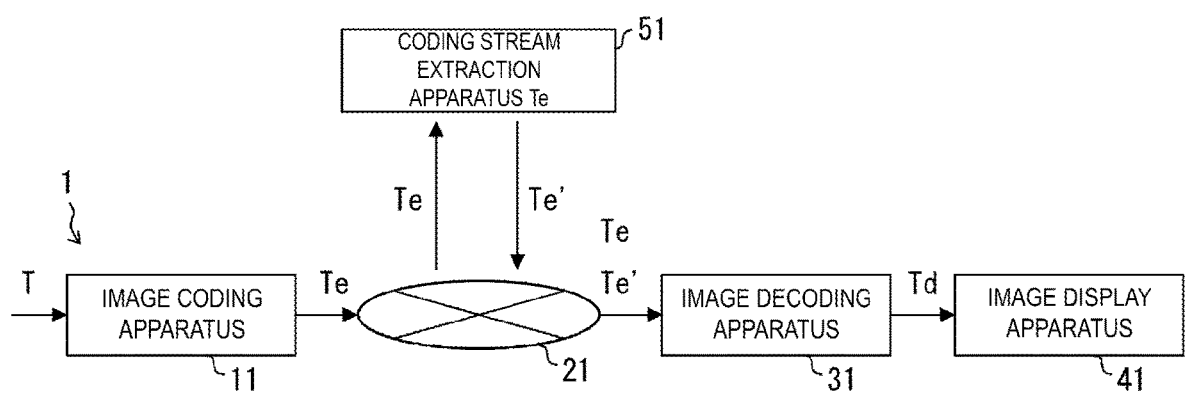
FIG. 16 is a schematic diagram illustrating the configuration of an image transmission system according to an embodiment of the present invention.

Hereinafter, embodiments of the present invention will be disclosed with reference to the drawings. FIG. 16 is a schematic diagram illustrating the configuration of an image transmission system 1 according to an embodiment of the present invention.

The image transmission system 1 transmits a coding stream (coded data) of an image corresponding to a range, decodes the transmitted coding stream, and displays the image. In addition, the image transmission system 1 receives information from a user for designating a range for a displayed image. The image transmission system 1 is configured to include an image coding apparatus (video coding apparatus) 11, a network 21, an image decoding apparatus (video decoding apparatus) 31, an image display apparatus 41, and a coding stream extraction apparatus 51.

An image T formed from an image of a single layer or a plurality of layers is input to the image coding apparatus 11. A layer is a concept that is used for distinguishing between a plurality of pictures in a case that there are one or more pictures during a specific time. For example, encoding the identical picture in a plurality of layers having different image qualities and resolutions is scalable coding, and coded pictures having different viewpoints in a plurality of layers is view scalable coding. In a case that a prediction (an inter-layer prediction, an inter-view prediction) between pictures in a plurality of layers is performed, coding efficiency extensively improves. In addition, even in a case that a prediction is not performed (simulcast), a coding stream can be compiled.

The network 21 transmits a coding stream Te generated by the image coding apparatus 11 to the image decoding apparatus 31 and the coding stream extraction apparatus 51. The network 21 transmits a coding stream Te' generated by the coding stream extraction apparatus 51 to the image decoding apparatus 31. The network 21 is the Internet, a wide area network (WAN), a local area network (LAN), or a combination thereof. The network 21 is not necessarily limited to a bidirectional communication network and may be a unidirectional communication network configured to transmit broadcast waves of digital terrestrial television broadcasting, satellite broadcasting, or the like. The network 21 may be replaced with a storage medium such as a Digital Versatile Disc (DVD) or a Blue-ray Disc (BD) on which a coding stream Te is recorded.

The image decoding apparatus 31 decodes each of the coding stream Te and the coding stream Te' transmitted from the network 21 and generates one or a plurality of decoded images Td.

The image display apparatus 41 displays all or some of one or a plurality of decoded images Td generated by the image decoding apparatus 31. For example, the image display apparatus 41 includes a display device such as a liquid crystal display, an organic Electro-Luminescence (EL) display, or the like. In addition, in spatial scalable coding and SNR scalable coding, an enhanced layer image having high image quality is displayed in a case that the image decoding apparatus 31 and the image display apparatus 41 have a high processing capability, and a base layer image not requiring a processing capability or display capability as high as those of an enhanced layer is displayed in a case that the image decoding apparatus 31 and the image display apparatus 41 have a low processing capability.

The coding stream extraction apparatus 51 may receive information that designates a display area of a picture in either the image decoding apparatus 31 or the image display apparatus 41 in accordance with a user's input operation or the like. The picture is divided into a plurality of subpictures.

The coding stream extraction apparatus 51 cuts out coding streams designated by a user from the coding stream Te and combines the coding streams, thereby generating a coding stream Te' that includes a subpicture corresponding to the designated display area. In addition, the coding stream extraction apparatus 51 generates a subpicture parameter set (SPPS) indicating which coded data of which subpicture is included in the generated coding stream Te' and includes the generated subpicture parameter set in the coding stream Te'.

Operator

Operators used in the present specification will be disclosed subsequently.

">>" is a right bit shift, "<<" is a left bit shift, "&" is a bitwise AND, "|" is a bitwise OR, and "|=" is an OR assignment operator.

x?y:z is a tertiary operator representing that the value is y in a case that x is true (not "0") and the value is z in a case that x is false (0).

Clip3 (a, b, c) is a function for clipping c at a value equal to or greater than a and less than or equal to b and is a function returning a in a case that c is less than a (c<a), returning b in a case that c is greater than b (c>b), and returning c in other cases (provided that a is less than or equal to b (a<=b)).

Structure of Coding Stream Te

Prior to the detailed disclosure of the image coding apparatus 11 and the image decoding apparatus 31 according to an embodiment of the present invention, a data structure of the coding stream Te generated by the image coding apparatus 11 and decoded by the image decoding apparatus 31 will be disclosed.

Figure 1:
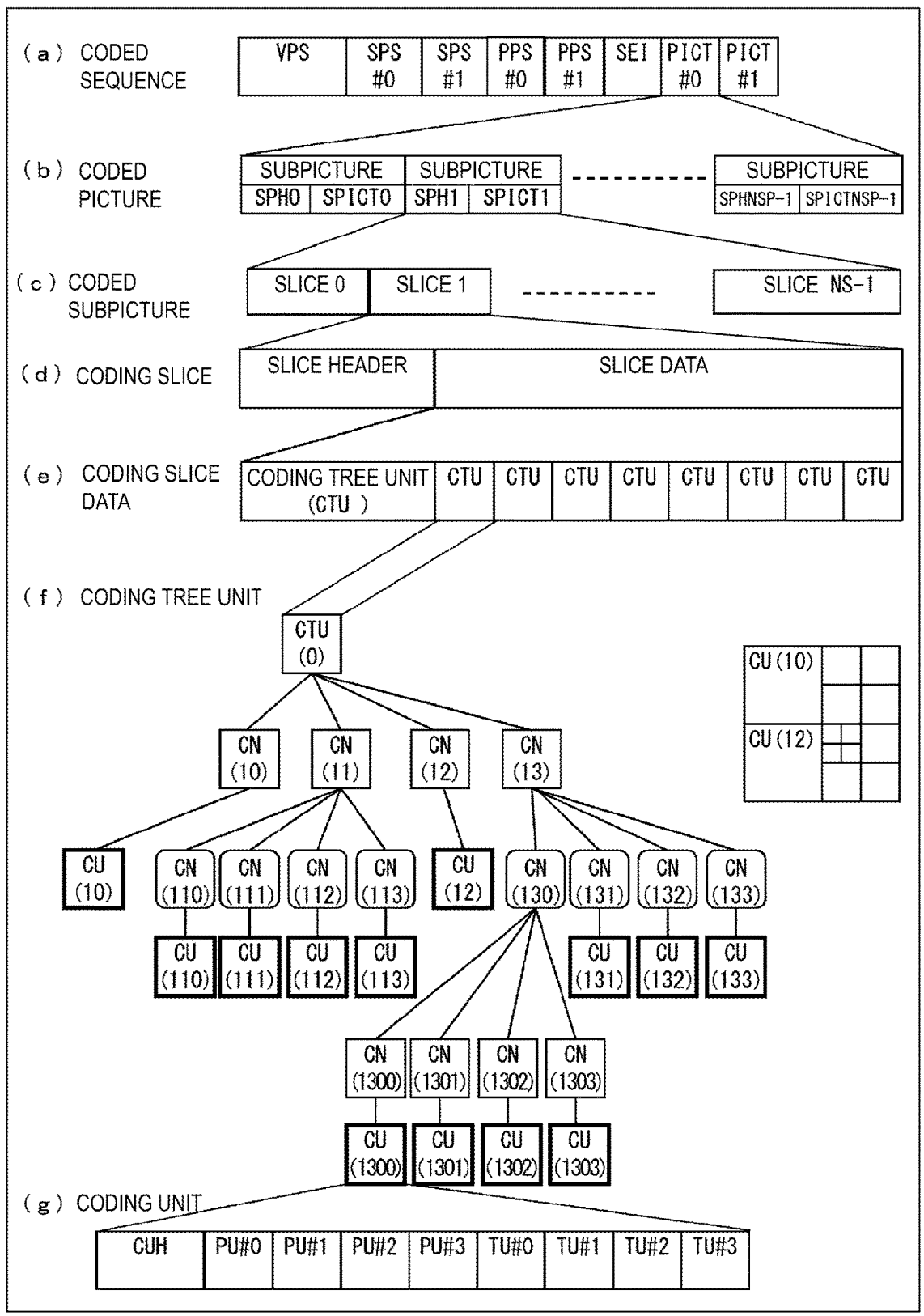
FIG. 1 is a diagram illustrating a hierarchical structure of data of a coding stream according to an embodiment of the present invention.

FIG. 1 is a diagram illustrating a hierarchical structure of the coding stream Te according to an embodiment of the present invention. For example, the coding stream Te includes a sequence and pictures configuring the sequence. FIG. 1 (a) to (g) are diagrams respectively illustrating a coded sequence that defines a sequence (SEQ), a coded picture that defines a picture (PICT), a coding subpicture that defines a subpicture (SPICT), a coding slice that defines a slice (S), coding slice data that defines slice data, a coding tree unit included in the coding slice data, and a coding unit (CU) included in a coding tree unit. The coded sequence illustrated in FIG. 1(a), the coded picture illustrated in FIG. 1(b), and the coding subpicture illustrated in FIG. 1(c) are illustrated as a hierarchical structure of the coding stream Te of the picture 1 illustrated in FIG. 4.

Coded Sequence

In the coded sequence, a set of data used by the image decoding apparatus 31 for decoding a sequence SEQ that is a processing target is disclosed. As illustrated in FIG. 1(a), the sequence SEQ includes a sequence parameter set SPS, a picture parameter set PPS, and a coded picture PICT. The coded sequence according to an embodiment of the present invention may include a video parameter set VPS.

In the video parameter set VPS, in video configured from a plurality of layers, a set of coding parameters common to a plurality of videos, a plurality of layers included in video, and a set of coding parameters relating to individual layers are disclosed.

In the sequence parameter set SPS, a set of coding parameters used by the image decoding apparatus 31 for decoding a target sequence is disclosed. For example, a width and a height of a picture are disclosed. There may be a plurality of SPSs. In such a case, one of the plurality of SPSs is selected using the PPS.

In the picture parameter set PPS, a set of coding parameters used by the image decoding apparatus 31 for decoding each picture in a target sequence is disclosed. For example, a reference value (pic_init_qp_minus26) of a quantization step size used for decoding of a picture and a flag (weighted_pred_flag) indicating an application of a weighted prediction are included. There may be a plurality of PPSs. In such a case, one of a plurality of PPSs is selected from each slice header.

Coded Picture

In the coded picture, a set of data used by the image decoding apparatus 31 for decoding the picture PICT that is a target is disclosed. As illustrated in FIG. 1(b), the picture PICT includes one or a plurality of subpicture headers SPH and subpictures SPICT (here, NSP represents a total number of subpictures included in the picture PICT).

The subpicture header SPH includes a unique code and a subpicture ID of the target subpicture. The subpicture and the subpicture header SPH will be disclosed subsequently.

Coding Subpicture

In the coding subpicture, a set of data used by the image decoding apparatus 31 for decoding the subpicture SPICT that is a processing target is disclosed. As illustrated in FIG. 1(c), the subpicture SPICT includes one or a plurality of slices S0 to SNS-1 (here, NS is a total number of slices included in the subpicture SPICT).

The subpicture may be defined by a limitation on the capability of the image decoding apparatus 31 defined by a profile, a level, or the like.

Hereinafter, in a case that it is not necessary to distinguish between the slices S0 to SNS-1, subscripts of reference signs may be omitted in the disclosure. In addition, the same applies to other data with subscripts included in the coding stream Te disclosed subsequently.

Coding Slice

In the coding slice, a set of data used by the image decoding apparatus 31 for decoding the slice S that is a processing target is disclosed. As illustrated in FIG. 1(d), the slice S includes a slice header SH and slice data SDATA.

The slice header SH includes a coding parameter group used by the image decoding apparatus 31 for determining a method for decoding a target slice. Slice type designation information (slice_type) designating a slice type is one example of a coding parameter included in the slice header SH.

Examples of slice types that can be designated using the slice type designation information include (1) I slice that uses only an intra prediction at the time of encoding, (2) P slice that uses a unidirectional prediction or an intra prediction at the time of encoding, (3) B slice that uses a unidirectional prediction, a bidirectional prediction, or an intra prediction and the like at the time of encoding.

The slice header SH may include a reference to the picture parameter set PPS (pic_parameter_set_id) included in the coding video sequence.

Coding Slice Data

In the coding slice data, a set of data used by the image decoding apparatus 31 for decoding the slice data SDATA that is a processing target is disclosed. As illustrated in FIG. 1(e), the slice data SDATA includes coding tree units (CTUs). A CTU is a block of a fixed size (for example, 64×64) constituting a slice, and may be called a largest coding unit (LCU).

Coding Tree Unit

As illustrated in FIG. 1(f), a set of data used by the image decoding apparatus 31 for decoding the coding tree unit that is a processing target is disclosed. The coding tree unit is split by recursive quad tree splits. Nodes of a tree structure obtained by recursive quad tree splits are referred to as coding nodes (CNs). Intermediate nodes of a quad tree are coding nodes, and the coding tree unit itself is also disclosed as a highest coding node. The CTU includes a split flag (cu_split_flag), and in a case that cu_split_flag is 1, the CTU is split into four coding node CNs. In a case that cu_split_flag is 0, the coding node CN is not split, and has one coding unit (CU) as a node. The coding unit CU is an end node of the coding nodes and is not split any further. The coding unit CU is a basic unit of coding processing.

In addition, in a case that a size of the coding tree unit CTU is 64×64 pixels, a size of the coding unit may be any one of 64×64 pixels, 32×32 pixels, 16×16 pixels, and 8×8 pixels.

Coding Unit

As illustrated in FIG. 1(g), a set of data used by the image decoding apparatus 31 for decoding the coding unit that is a processing target is disclosed. Specifically, the coding unit includes a prediction tree, a transform tree, and a CU header CUH. In the CU header, a prediction mode, a split method (PU split mode), and the like are disclosed.

In the prediction tree, prediction information (a reference picture index, a motion vector, and the like) of each prediction unit (PU) obtained by splitting the coding unit into one or more parts is disclosed. The prediction unit is one or a plurality of areas, which do not overlap each other, constituting the coding unit. In addition, the prediction tree includes one or a plurality of prediction units obtained by the previously disclosed splitting. Hereinafter, a unit of prediction in which the prediction unit is further split will be referred to as a "subblock." The subblock includes a plurality of pixels. In a case that sizes of a prediction unit and a subblock are the same, there is one subblock in the prediction unit. In a case that the prediction unit has a larger size than the subblock, the prediction unit is split into subblocks. For example, in a case that the prediction unit has a size of 8×8 and the subblock has a size of 4×4, the prediction unit is split into four subblocks which include two horizontal splits and two vertical splits.

Prediction processing may be performed for each of the prediction units (subblocks).

Generally speaking, there are two types of splits in the prediction tree, including a case of an intra prediction and a case of an inter prediction. The intra prediction refers to a prediction in an identical picture, and the inter prediction refers to prediction processing performed between different pictures (for example, between pictures of different display times, and between pictures of different layer images).

In a case of the intra prediction, a split method has sizes of 2N×2N (the same size as that of the coding unit) and N×N.

In addition, in a case of the inter prediction, the split method includes coding in a PU split mode (part_mode) of coded data, and has sizes of 2N×2N (the same size as that of the coding unit), 2N×N, 2N×nU, 2N×nD, N×2N, nL×2N, nR×2N, N×N, and the like. Here, 2N×N and N×2N indicate a symmetric split of 1:1, and 2N×nU, 2N×nD, nL×2N, and nR×2N indicate an asymmetric split of 1:3 and 3:1. The PUs included in the CU are sequentially expressed as PU0, PU1, PU2, and PU3.

In addition, in the transform tree, the coding unit is split into one or a plurality of transform units, and a position and a size of each transform unit are defined. In another expression, the transform unit is one or a plurality of non-overlapping areas constituting the coding unit. In addition, the transform tree includes one or a plurality of transform units obtained by the previously disclosed split.

Splits in the transform tree include splits to allocate an area of the same size as the area of the coding unit as a transform unit, and those by recursive quad tree splits similarly to the above-mentioned split of CUs.

Transform processing is performed for each of these transform units.

Subpicture Sequence

Figure 2:
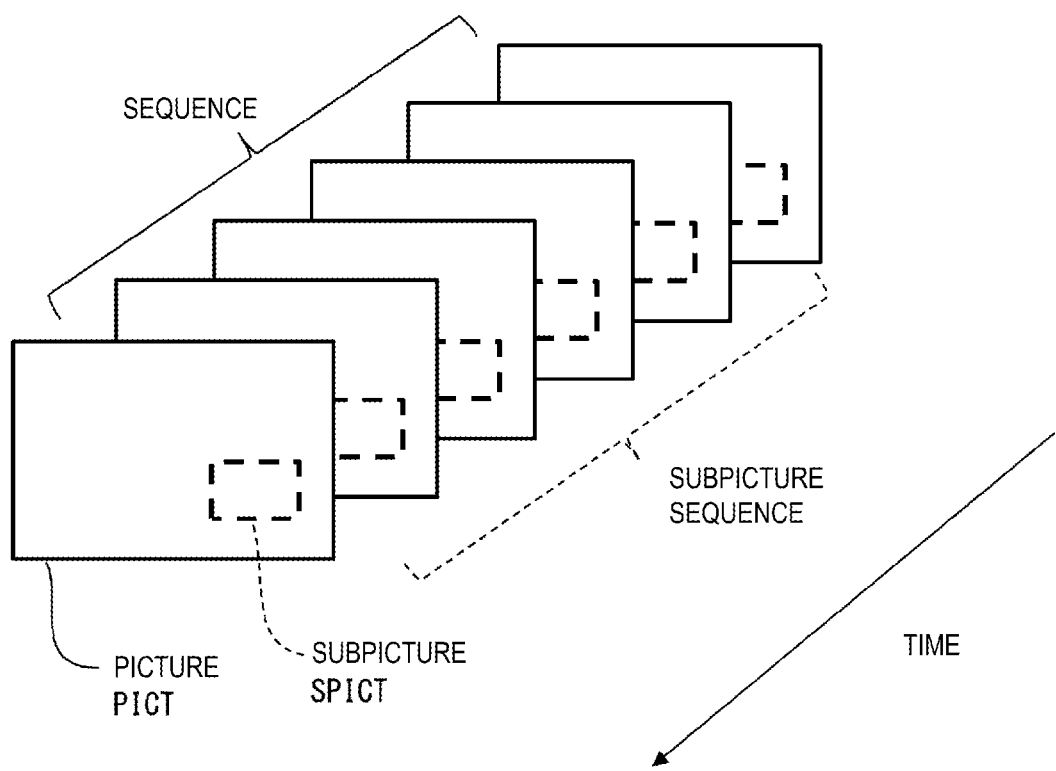
FIG. 2 is a conceptual diagram illustrating a subpicture sequence according to an embodiment of the present invention.

The subpicture sequence will now be disclosed with reference to FIG. 2. FIG. 2 is a conceptual diagram illustrating a subpicture sequence according to an embodiment of the present invention. As illustrated in FIG. 2, the sequence is composed of pictures PICT that are continuous in a plurality of time directions. A subpicture SPICT is obtained by dividing the picture PICT, and more specifically, the picture PICT is divided into parts without allowing overlapping between them. The subpictures that are continuous in the plurality of time directions will be referred as a subpicture sequence.

In accordance with such a configuration, the image coding apparatus 11 and the image decoding apparatus 31 may efficiently and independently perform encoding or decoding in parallel in units of subpicture sequences.

Prediction Parameter

A prediction image of Prediction Units (PUs) is derived by prediction parameters attached to the PUs. The prediction parameter includes a prediction parameter of an intra prediction or a prediction parameter of an inter prediction. The prediction parameter of an inter prediction (inter prediction parameters) will be disclosed subsequently. The inter prediction parameter includes prediction list utilization flags predFlagL0 and predFlagL1, reference picture indexes refIdxL0 and refIdxL1, and motion vectors mvL0 and mvL1. The prediction list utilization flags predFlagL0 and predFlagL1 are flags to indicate whether or not reference picture lists referred to as L0 list and L1 list respectively are used, and a corresponding reference picture list is used in a case that the value is 1. In a case that "a flag indicating whether or not XX" is disclosed, a case where the flag is not 0 (for example, 1) is assumed to be a case where XX is true, and a case where the flag is 0 is assumed to be a case where XX is not true, and in a logical negation, a logical product and the like, 1 is treated as true, and 0 is treated as false (the same applies hereinafter). However, other values can be used for true values and false values in real apparatuses and methods.

For example, syntax elements to derive inter prediction parameters included in a coded data include a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX.

Reference Picture List

A reference picture list is a list constituted by reference pictures stored in a reference picture memory 306.

Merge Prediction and AMVP Prediction

Decoding (coding) methods of prediction parameters include a merge prediction (merge) mode and an Adaptive Motion Vector Prediction (AMVP) mode, and merge_flag is a flag to identify the merge mode and AMVP mode. The merge prediction mode is a mode to derive, from prediction parameters of neighboring PUs already processed without including a prediction list utilization flag predFlagLX (or an inter prediction indicator inter_pred_idc), a reference picture index refIdxLX, and a motion vector mvLX in a coded data. The AMVP mode is a mode to include, in coded data, an inter prediction indicator inter_pred_idc, a reference picture index refIdxLX, a motion vector mvLX. Note that the motion vector mvLX is coded as a prediction vector index mvp_LX_idx identifying a prediction vector mvpLX and a difference vector mvdLX.

The inter prediction indicator inter_pred_idc is a value that indicates types and the number of reference pictures and is one of PRED_L0, PRED_L1, and PRED_BI. PRED_L0 and PRED_L1 indicate use of reference pictures managed in the reference picture list of the L0 list and the L1 list, respectively, and indicate use of one reference picture (uni-prediction). PRED_BI indicates use of two reference pictures (bi-prediction BiPred), and use reference pictures managed in the L0 list and the L1 list. The prediction vector index mvp_LX_idx is an index indicating a prediction vector, and the reference picture index refIdxLX is an index indicating reference pictures managed in a reference picture list. Note that LX is a method used in a case of not distinguishing the L0 prediction and the L1 prediction, and distinguishes parameters for the L0 list and parameters for the L1 list by replacing LX with L0 and L1.

The merge index merge_idx is an index to indicate use of either prediction parameter as a prediction parameter of a decoding target PU among prediction parameter candidates (merge candidates) derived from PUs of which the processing is completed.

Motion Vector

The motion vector mvLX indicates a gap between blocks in two different pictures. A prediction vector and a difference vector related to the motion vector mvLX is referred to as a prediction vector mvpLX and a difference vector mvdLX respectively.

Configuration of Image Coding Apparatus

Figure 3:
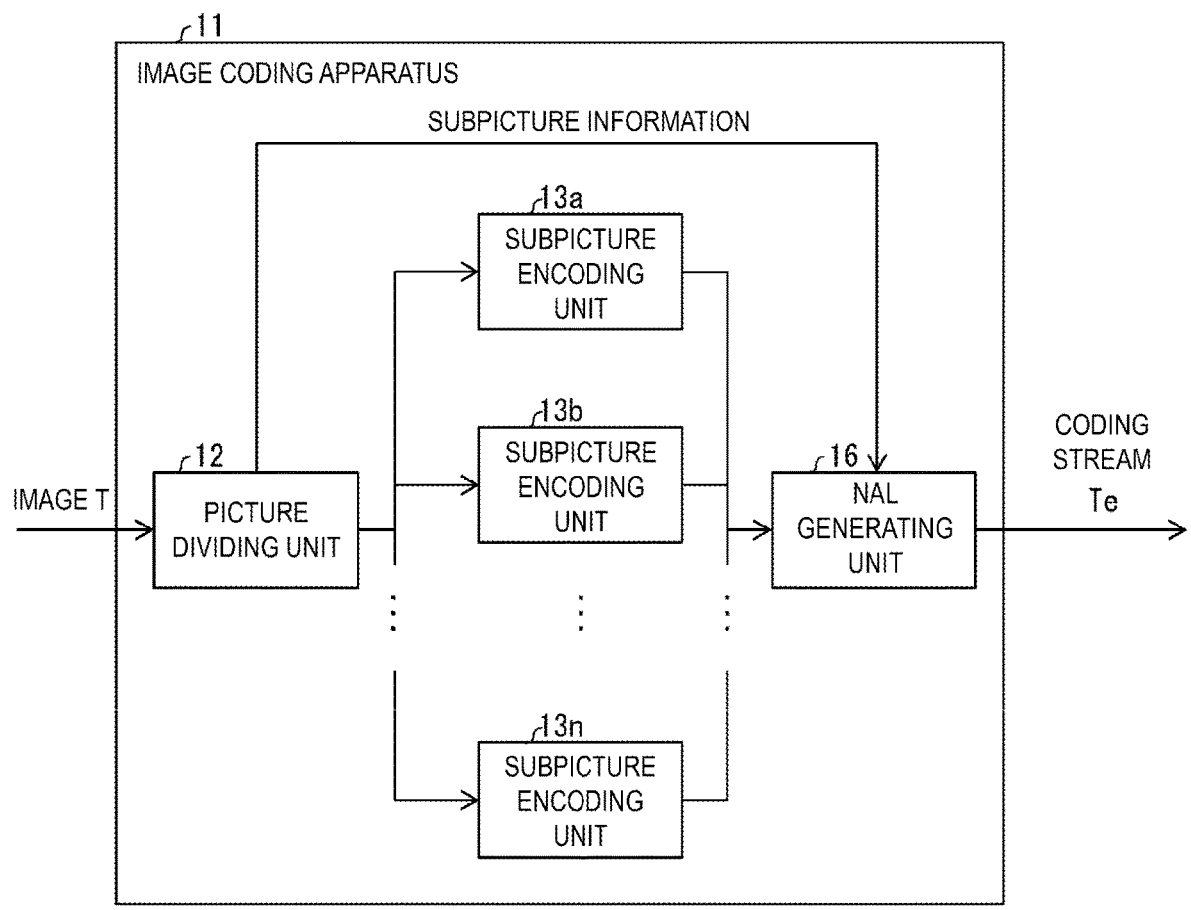
FIG. 3 is a block diagram illustrating the configuration of an image coding apparatus according to an embodiment of the present invention.

Next, a configuration of the image coding apparatus 11 according to an embodiment of the present invention will be disclosed. FIG. 3 is a block diagram illustrating the configuration of the image coding apparatus 11 according to an embodiment of the present invention.

The image coding apparatus 11 generates coded data by encoding image data. The image coding apparatus 11 is configured to include a picture dividing unit 12, subpicture encoding units 13a to 13n, and a network abstraction layer (NAL) generating unit 16.

The picture dividing unit 12 divides an image T (picture) into a plurality of subpictures and transmits the subpictures to the subpicture encoding units 13a to 13n.

The picture dividing unit 12 generates subpicture information and transmits the subpicture information to the NAL generating unit 16.

Each of the subpicture encoding units 13a to 13n encodes a subpicture. Each of the subpicture encoding units 13a to 13n may encode subpictures in units of subpicture sequences. In this way, according to the subpicture encoding units 13a to 13n, subpictures can be efficiently encoded in parallel.

Here, each of the subpicture encoding units 13a to 13n performs an encoding process using a subpicture as one independent video sequence and does not use prediction information between subpicture sequences both in time and space at the time of performing an encoding process. In other words, in a case that a specific subpicture in a picture is to be encoded, the subpicture encoding units 13a to 13n do not use other subpictures in the picture. In addition, in an inter prediction, the subpicture encoding units 13a to 13n do not use a subpicture belonging to a different subpicture sequence. In other words, even in pictures at different times, an encoding process is performed using only information of subpictures included in a subpicture sequence to which a target subpicture belongs.

The NAL generating unit 16 generates coded data including image data for each of subpictures obtained by dividing the picture. More specifically, the NAL generating unit 16 generates a coding stream Te in units of NAL units from subpicture information transmitted from the picture dividing unit 12 and coding subpictures encoded by the subpicture encoding units 13a to 13n.

In addition, the NAL generating unit (a coded data generating unit) 16 receives subpicture headers SPH including subpicture identification information used for distinguishing subpictures from each other, which are generated for each subpicture, from the subpicture encoding units 13a to 13n, encodes the subpicture headers in combination with the coding subpictures in units of NAL units, and includes the encoded information in the coding stream Te. The subpicture header SPH includes at least a unique code (0x0000xx) and a subpicture ID of a target subpicture. A specific configuration of the NAL unit will be disclosed subsequently.

According to the previously disclosed configuration, the coded data includes image data for each subpicture and subpicture identification information (subpicture IDs) used for distinguishing subpictures from each other.

Therefore, the coding stream extraction apparatus 51 and the like can easily generate coded data by performing removal and combination in units of coded data of subpictures using the coded data disclosed previously.

Picture Having Subpictures as Constituent Units

Figure 4:
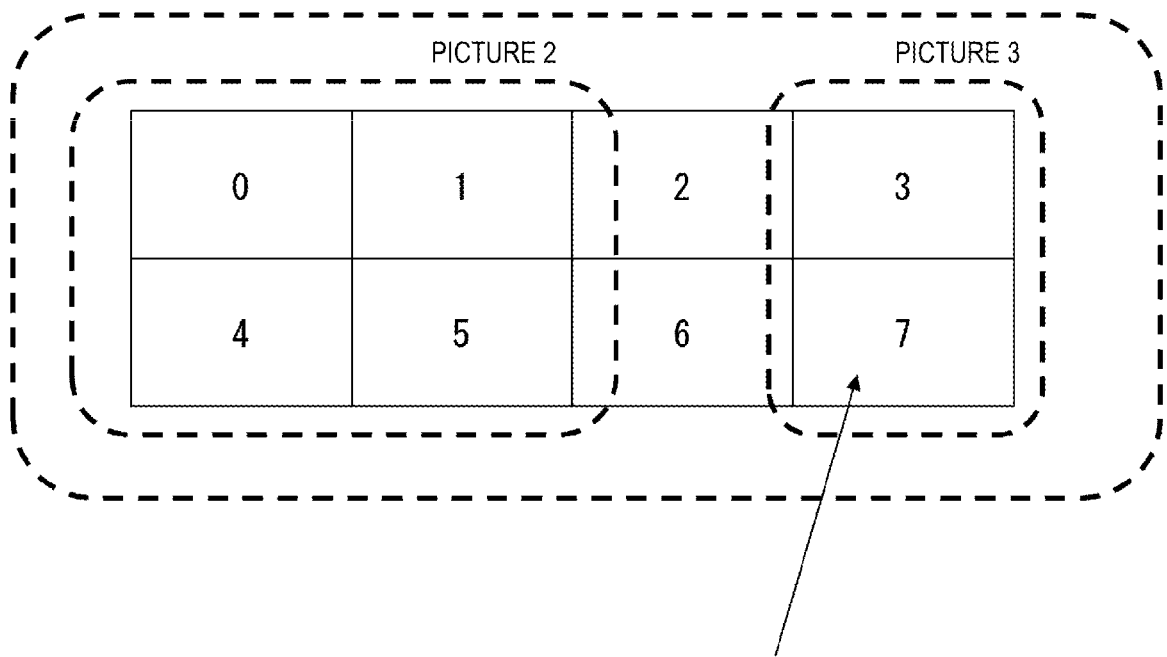
FIG. 4 is a diagram illustrating a picture having subpictures as configuration units according to an embodiment of the present invention.
Figure 4:
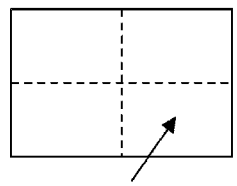
Figure 4:
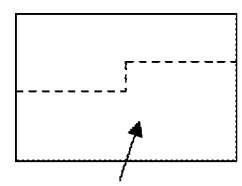

FIG. 4 is a diagram illustrating a picture having subpictures as configuration units according to an embodiment of the present invention. The picture 1 illustrated in FIG. 4 illustrates the entire picture. The picture 1 is divided into a plurality of subpictures (subpictures 0 to 7). Here, 0 to 7 are subpicture IDs and are identification information that identifies subpictures. A plurality of "pictures" is disclosed with subpictures used as basic constituent blocks. For example, as illustrated in FIG. 4, the entire picture (picture 1) is a picture that includes all the subpictures of the subpicture 0 to the subpicture 7. A picture 2, which is a part of the entire picture, is a picture that includes subpictures 0, 1, 4, and 5. A picture 3, which is a part of the entire picture, is a picture that includes subpictures 3 and 7. As illustrated in FIG. 4, a subpicture may include a plurality of slices or tiles.

In this embodiment, the image coding apparatus 11 generates the coding stream Te that includes coded data of the entire picture (picture 1), in other words, in the example illustrated in FIG. 4, coded data of the subpictures 0 to 7.

As disclosed previously, the coded sequence illustrated in FIG. 1(a), the coded picture illustrated in FIG. 1(b), and the coding subpicture illustrated in FIG. 1(c) are illustrated as the hierarchical structure of the coding stream Te of the picture 1 illustrated in FIG. 4.

Configuration of Subpicture Encoding Units

Figure 5:
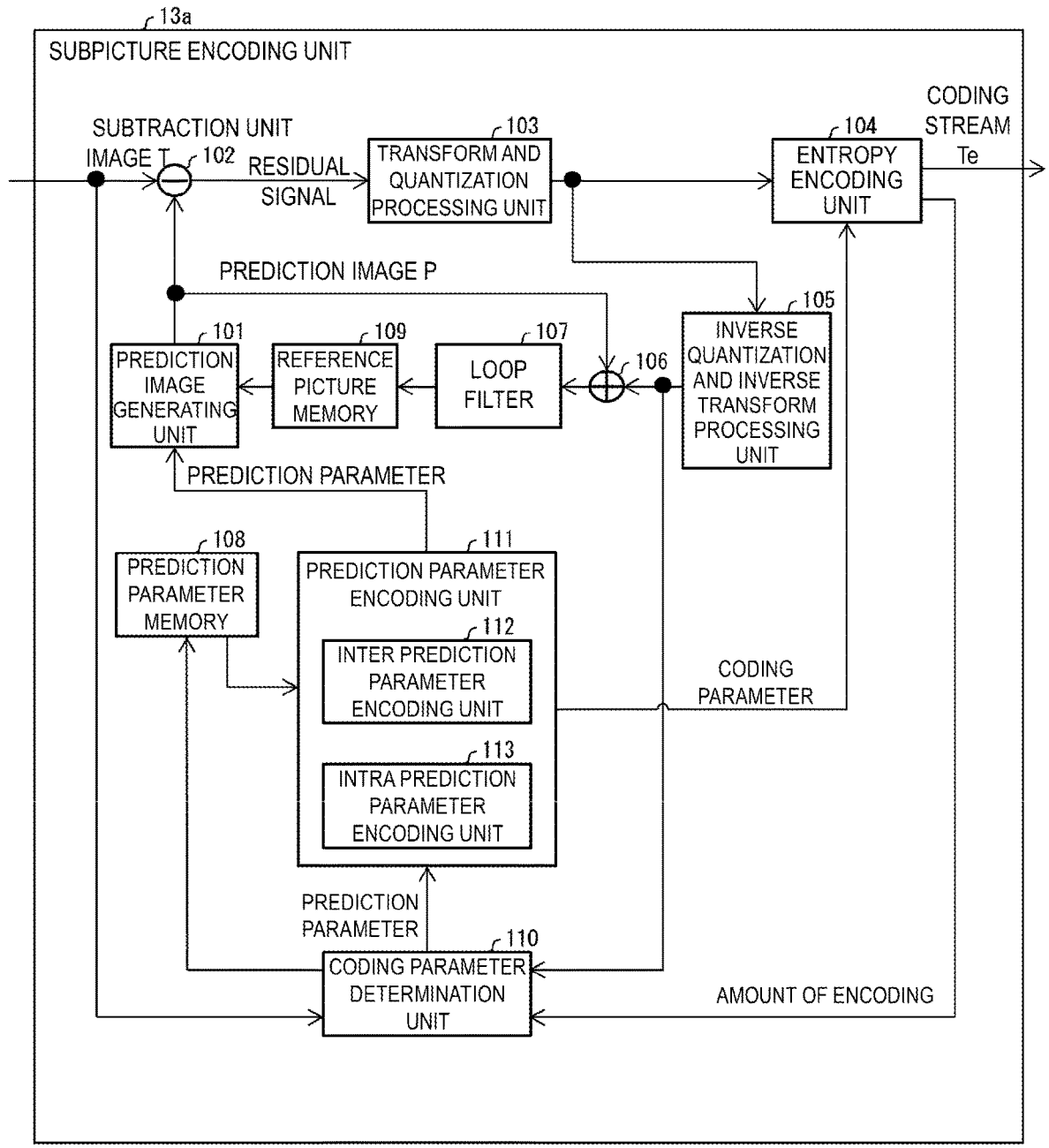
FIG. 5 is a block diagram illustrating the configuration of a subpicture encoding unit of an image coding apparatus according to an embodiment of the present invention.

Next, configurations of the subpicture encoding units 13a to 13n will be disclosed. Hereinafter, as an example, the configuration of the subpicture encoding unit 13a will be disclosed with reference to FIG. 5. FIG. 5 is a block diagram illustrating the configuration of the subpicture encoding unit 13a. Although a configuration in which the image coding apparatus 11 includes the plurality of subpicture encoding units 13a to 13n is disclosed in this embodiment, the image coding apparatus 11 may be configured to include one subpicture encoding unit. In such a configuration, one subpicture encoding unit may sequentially encode subpictures.

The subpicture encoding units 13a to 13n generate coded data for each subpicture. More detailed disclosure is as follows. The subpicture encoding unit 13a is configured to include a prediction image generation unit 101, a subtraction unit 102, a transform and quantization processing unit 103, an entropy encoding unit 104, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, and a prediction parameter encoding unit 111. The prediction parameter encoding unit 111 is configured to include an inter prediction parameter encoding unit 112 and an intra prediction parameter encoding unit 113.

The prediction image generation unit 101 generates a prediction image P of a PU based on a pixel value of a reference block read from the reference picture memory, using a parameter input by the prediction parameter encoding unit. The prediction image generated by the prediction image generation unit 101 is output to the subtraction unit 102 and the addition unit 106.

The subtraction unit 102 subtracts a signal value of the prediction image P of the PU input from the prediction image generation unit 101 from a pixel value of a corresponding PU of the image T to generate a residual signal. The subtraction unit 102 outputs the generated residual signal to the transform and quantization processing unit 103.

The transform and quantization processing unit 103 performs a frequency transform on the residual signal input from the subtraction unit 102 to calculate a transform coefficient. The transform and quantization processing unit 103 quantizes the calculated transform coefficient to obtain a quantization coefficient. The transform and quantization processing unit 103 outputs the obtained quantization coefficient to the entropy encoding unit 104 and the inverse quantization and inverse transform processing unit 105.

To the entropy encoding unit 104, the quantization coefficient is input from the transform and quantization processing unit 103, and coding parameters are input from the prediction parameter encoding unit 111. For example, input coding parameters include codes such as a reference picture index refIdxLX, a prediction vector index mvp_LX_idx, a difference vector mvdLX, a prediction mode predMode, and a merge index merge_idx. The entropy encoding unit 104 encodes header information such as an SPS, a PPS, a subpicture header SPH, a slice header SH, and the like.

In addition, the entropy encoding unit 104 generates a slice header SH.

In more detail, the subpicture encoding unit 13a initializes a slice address that indicates a first CTU address of each slice included in the above-disclosed subpicture for each subpicture. The entropy encoding unit 104 generates a slice header that includes the slice address and includes the slice header in coded data for each subpicture.

In more detail, CTUs in a subpicture are scanned in order of raster scanning, and CTU addresses are assigned to the CTUs in the subpicture in the order of raster scanning. To each slice, a first CTU address of the slice is assigned as a slice address SHaddr. As disclosed previously, slice addresses of slices included in a subpicture are initialized for each subpicture. In other words, for each subpicture, a first slice address of slices included in the subpicture starts from 0. In other words, in each subpicture, a first CTU address of a first slice (slice lead) is 0.

Figure 6:
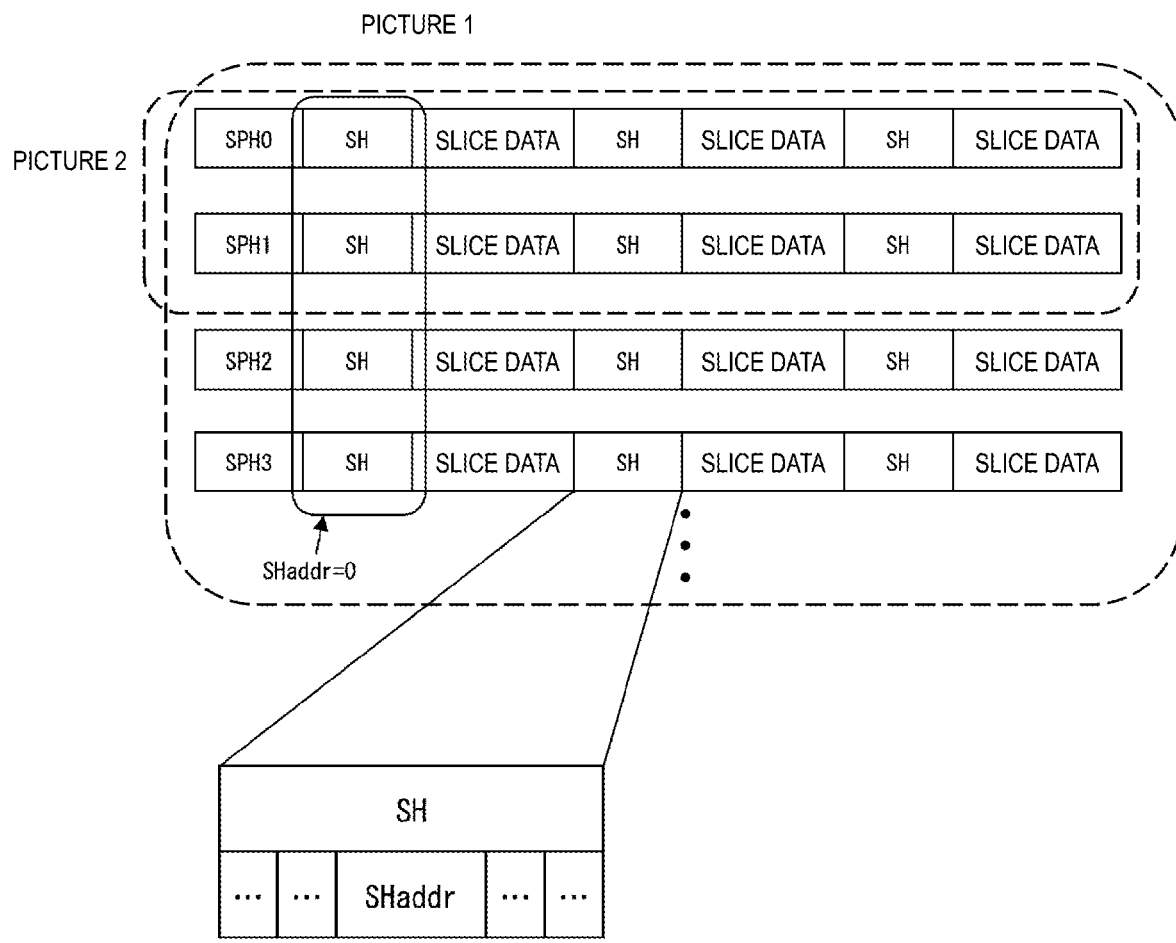
FIG. 6 is a diagram illustrating a portion of a data structure of a coding stream according to an embodiment of the present invention.

FIG. 6 is a diagram illustrating a portion of a data structure of a coding stream Te' according to an embodiment of the present invention. The coding stream Te' includes a plurality of coding subpictures. Each coding subpicture includes one or a plurality of encoded slices. As illustrated in FIG. 6, the slice address SHaddr of a first encoded slice in each coding subpicture is 0. In the configuration disclosed previously, there are the same slice addresses in the entire picture at the same time. For this reason, slices having the same slice address may be distinguished based on subpictures to which the slices belong. For the distinction disclosed previously, for example, information included in the subpicture header SPH may be used.

According to the configuration disclosed previously, the slice address (the address of the first CTU of the slice) is initialized for each subpicture. In other words, the slice address starts from 0 for each subpicture. For this reason, consecutive numbers are not assigned to slices belonging to different subpictures as slice addresses.

For this reason, in a case that coded data is newly generated through cutting-out and combination in units of coded data of subpictures using the coded data disclosed previously by the coding stream extraction apparatus 51 and the like, slice addresses of subpictures do not need to be rewritten. In related art, in a case that a specific area is extracted from coded data configuring a picture, slice addresses of an extracted area need to be rewritten from slice addresses corresponding to positions in the picture before extraction to slice addresses corresponding to positions in the picture after extraction. In this configuration, the slice address SHaddr of the first encoded slice in each coding subpicture is constantly 0 regardless of whether it is before or after extraction. For this reason, for the coding subpicture after extraction, slice addresses do not need to be rewritten. In addition, even in a case that newly generated coded data does not include coded data of all the subpictures, missing (skipping) of slice addresses or CTU addresses does not occur. For this reason, errors in the image decoding apparatus 31, which may be caused by missing (skipping) slice addresses or CTU addresses, can be avoided.

Alternatively, in a case that the coding stream extraction apparatus 51 or the like generates coded data by combining extracted subpictures, the slice addresses and the CTU addresses do not need to be corrected, and the subpictures can be cut out and combined with a low processing load.

The entropy encoding unit 104 generates a coding stream by performing entropy coding of input quantization coefficients and coding parameters and outputs the generated coding stream to the outside.

The inverse quantization and inverse transform processing unit 105 performs inverse quantization on the quantization coefficient input from the transform and quantization processing unit 103 to obtain a transform coefficient. The inverse quantization and inverse transform processing unit 105 performs an inverse frequency transform on the obtained transform coefficient to calculate a residual signal. The inverse quantization and inverse transform processing unit 105 outputs the calculated residual signal to the addition unit 106.

The addition unit 106 adds a signal value of the prediction image P of the PU input from the prediction image generation unit 101 to a signal value of the residual signal input from the inverse quantization and inverse transform processing unit 105 for each pixel and generates a decoded image. The addition unit 106 stores the generated decoded image in the reference picture memory 109.

The loop filter 107 applies a deblocking filter, Sample Adaptive Offset (SAO), and an Adaptive Loop Filter (ALF) to the decoded image generated by the addition unit 106.

The prediction parameter memory 108 stores the prediction parameters generated by the coding parameter determination unit 110 for each picture and CU to be coded at a predetermined position.

The reference picture memory 109 stores the decoded image generated by the loop filter 107 for each picture and CU to be coded at a predetermined position.

The coding parameter determination unit 110 selects one set among a plurality of sets of coding parameters. A coding parameter refers to the previously disclosed prediction parameter or a parameter to be coded, the parameter being generated in association with the prediction parameter. The prediction image generation unit 101 generates the prediction image P of the PU by using each of the sets of the coding parameters.

The coding parameter determination unit 110 calculates, for each of the plurality of sets, a cost value indicating the magnitude of an amount of information and a coding error. A cost value is, for example, the sum of a code amount and the value obtained by multiplying a coefficient λ by a square error. The code amount is an amount of information of the coding stream Te obtained by performing entropy coding on a quantization error and a coding parameter. The square error is the sum of pixels for square values of residual values of residual signals calculated in the subtraction unit 102. The coefficient λ is a preconfigured real number greater than a zero. The coding parameter determination unit 110 selects a set of coding parameters of which cost value calculated is a minimum value. With this configuration, the entropy encoding unit 104 outputs the selected set of coding parameters as the coding stream Te to the outside and does not output an unselected set of coding parameters. The coding parameter determination unit 110 stores the determined coding parameters in the prediction parameter memory 108.

The prediction parameter encoding unit 111 derives a format for coding from parameters input from the coding parameter determination unit 110 and outputs the format to the entropy encoding unit 104. The derivation of the format for coding is, for example, to derive a difference vector from a motion vector and a prediction vector. The prediction parameter encoding unit 111 derives parameters necessary to generate a prediction image from parameters input from the coding parameter determination unit 110 and outputs the parameters to the prediction image generation unit 101. A parameter necessary to generate a prediction image is, for example, a motion vector of a subblock unit.

The inter prediction parameter encoding unit 112 derives inter prediction parameters such as a difference vector based on the prediction parameters input from the coding parameter determination unit 110. As a configuration for deriving parameters that are necessary for generation of a prediction image output to the prediction image generation unit 101, the inter prediction parameter encoding unit 112 includes a configuration that is partly the same as a configuration in which an inter prediction parameter decoding unit 303 (see FIG. 13 and the like) to be disclosed subsequently derives inter prediction parameters.

The intra prediction parameter encoding unit 113 derives a format for coding (for example, MPM_idx, rem_intra_luma_pred_mode, or the like) from the intra prediction mode IntraPredMode input from the coding parameter determination unit 110.

Configuration of Image decoding apparatus

Figure 12:
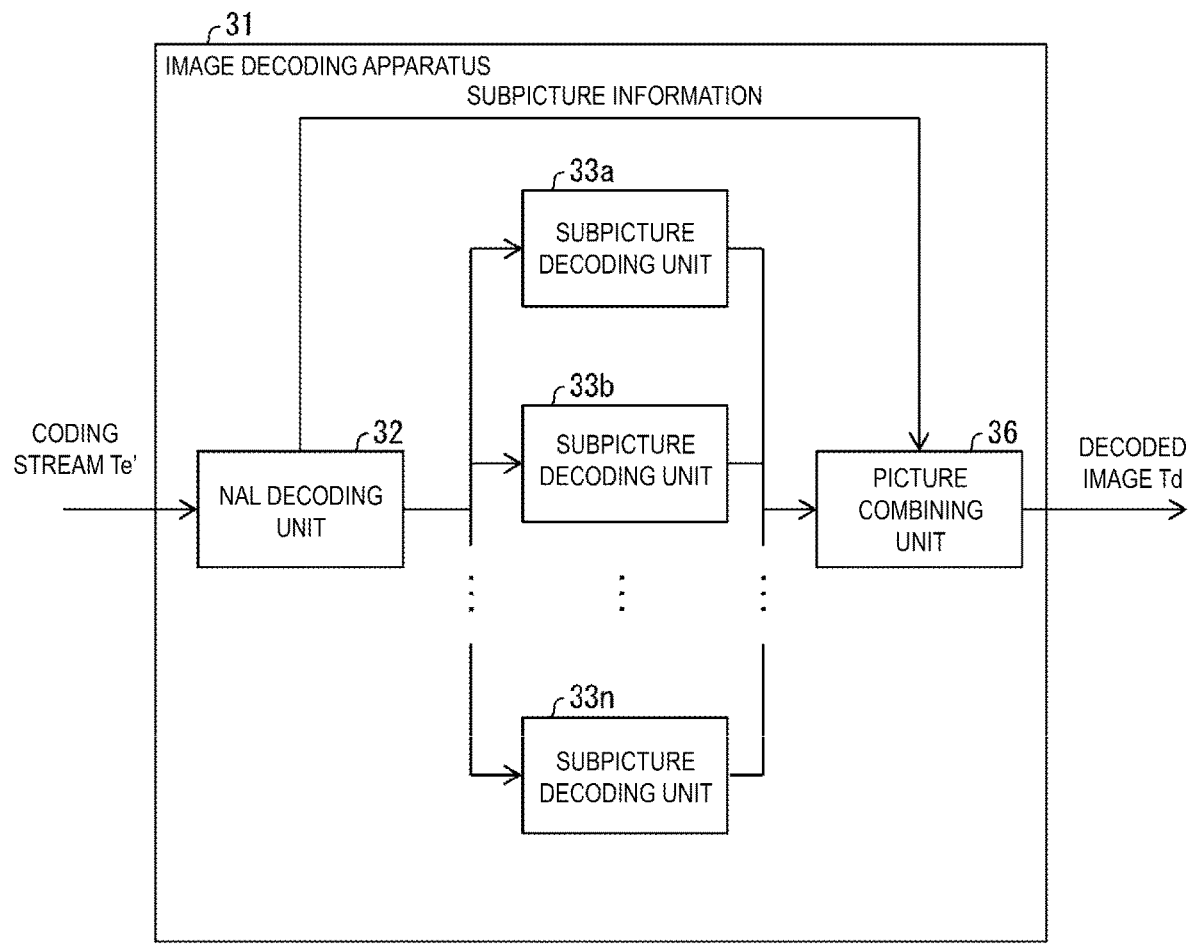
FIG. 12 is a block diagram illustrating the configuration of an image decoding apparatus according to an embodiment of the present invention.

Next, a configuration of the image decoding apparatus 31 according to an embodiment of the present invention will be disclosed. FIG. 12 is a block diagram illustrating the configuration of the image decoding apparatus 31 according to an embodiment of the present invention. The image decoding apparatus 31 is configured to include an NAL decoding unit 32, subpicture decoding units 33a to 33n, and a picture combining unit 36.

The NAL decoding unit 32 decodes a coding stream Te or a coding stream Te', which is encoded in units of network abstraction layer (NAL) units, input from the outside. The NAL decoding unit 32 transmits coding subpictures obtained by decoding the coding stream Te or the coding stream Te' to the subpicture decoding unit 33a to 33n. In addition, the NAL decoding unit 32 transmits subpicture information and the like to the picture combining unit 36.

The subpicture information is information that indicates subpictures included in the coding stream Te or the coding stream Te', a size and a position of each of the subpictures, a size of a picture constituted by the subpictures, and the like. In other words, information of a subpicture parameter set SPPS and the like are included in the subpicture information.

The subpicture decoding units 33a to 33n decode the subpicture headers SPH and the coding subpictures and transmit the decoded subpictures to the picture combining unit 36.

Here, the subpicture decoding units 33a to 33n perform a decoding process using the subpicture sequence as one independent video sequence and do not use the prediction information between subpicture sequences in time or in space in a case that the decoding process is performed. In other words, in the case of decoding a subpicture in a picture, the subpicture decoding units 33a to 33n do not use subpictures of other subpicture sequences.

In this way, for decoding subpictures, each of the subpicture decoding units 33a to 33n may perform a decoding process of a plurality of subpictures in parallel or may independently decode only one subpicture. As a result, according to the subpicture decoding units 33a to 33n, a decoding process can be performed efficiently.

The picture combining unit 36 refers to the subpicture information transmitted from the NAL decoding unit 32 and the subpictures decoded by the subpicture decoding units 33a to 33n and generates and outputs a decoded image Td.

In other words, the image decoding apparatus 31 includes the subpicture decoding units 33a to 33n that decode subpicture coded data included in a coding stream Te' and the picture combining unit 36 that synthesizes a decoded image from the decoded subpictures.

In the coding stream Te', image data for each subpicture obtained by dividing a picture, a subpicture header SPH, and a subpicture parameter set SPPS (a combination picture parameter set) having information used for obtaining a picture (combined picture) by combining subpictures are included. The subpicture header SPH includes subpicture identification information used for distinguishing subpictures from each other and is generated for each subpicture. The subpicture parameter set SPPS includes one or a plurality of pieces of subpicture identification information. Details of the subpicture parameter set SPPS will be disclosed subsequently.

The picture combining unit 36 synthesizes (generates) a decoded image of a picture (a combined picture) by referring to the subpicture parameter set SPPS included in the coding stream Te' and decoded images of subpictures.

According to the above-disclosed configuration, the image decoding apparatus 31 can use a subpicture parameter set representing a combination of subpictures corresponding to a partial area of a picture, which is designated by a user, and synthesize subpictures corresponding to the partial area. In other words, the image decoding apparatus 31 can generate an image desired by a user.

A slice header is included in the coding stream Te'. A slice address indicating a first CTU address of a slice included in a subpicture is included in the slice header. This slice address is initialized for each subpicture. The subpicture decoding units 33a to 33n generate decoded images of subpictures by referring to the slice header including slice addresses included in the coded data.

According to the above-disclosed configuration, the slice address of a subpicture is initialized for each subpicture. In other words, a slice address (a first CTU address of a slice) included in a subpicture starts from 0 for each subpicture. For this reason, consecutive numbers are not assigned to slices belonging to different subpictures as slice addresses.

For this reason, in a case that the coding stream extraction apparatus 51 or the like newly generates coded data through cutting out and combination in units of coded data of a subpicture using the coded data disclosed previously, a slice header and slice data are as follows. In other words, even in a case that the newly generated coded data does not include coded data of all the subpictures, missing (skipping) of a slice address (CTU address) does not occur. For this reason, occurrence of errors in the image decoding apparatus 31 that may be caused by missing (skipping) a slice address can be avoided.

Configuration of Subpicture Decoding Units

Figure 13:
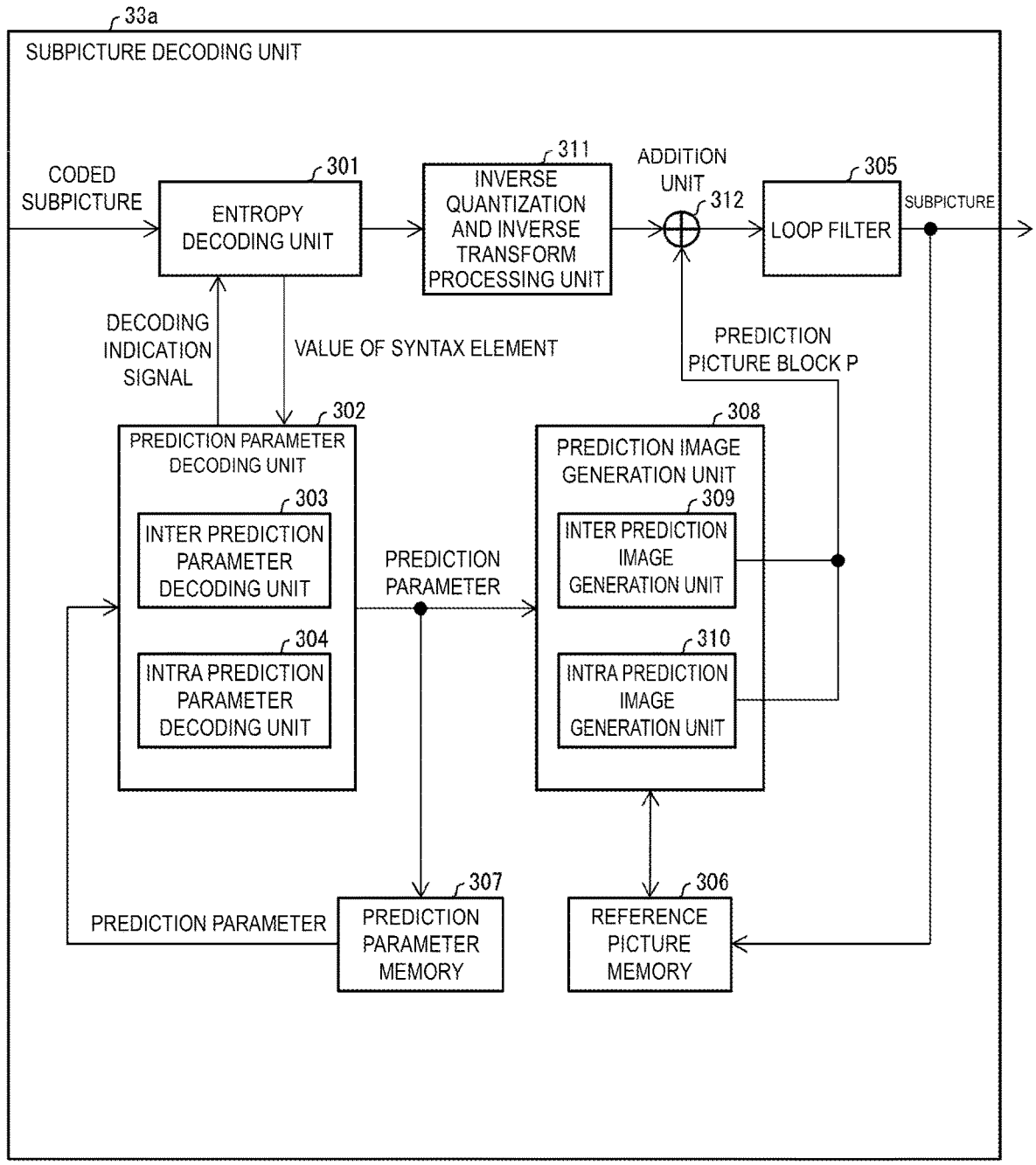
FIG. 13 is a block diagram illustrating the configuration of a subpicture decoding unit of an image decoding apparatus according to an embodiment of the present invention.

The configuration of the subpicture decoding units 33a to 33n will be disclosed. Hereinafter, the configuration of the subpicture decoding unit 33a will be disclosed with reference to FIG. 13 as an example. FIG. 13 is a block diagram illustrating the configuration of a subpicture decoding unit 33a.

The subpicture decoding unit 33a is configured to include an entropy decoding unit 301, a prediction parameter decoding unit 302, a loop filter 305, a reference picture memory 306, a prediction parameter memory 307, a prediction image generation unit 308, an inverse quantization and inverse transform processing unit 311, and an addition unit 312.

In addition, the prediction parameter decoding unit 302 includes an inter prediction parameter decoding unit 303 and an intra prediction parameter decoding unit 304. The prediction image generation unit 308 includes an inter prediction image generation unit 309 and an intra prediction image generation unit 310.

The entropy decoding unit 301 performs entropy decoding on a coding subpicture, thereby performing decoding with individual codes (syntax elements) separated from each other. As separated codes, there are prediction information used for generating a prediction image, residual information used for generating a differential image, and the like.

The entropy decoding unit 301 outputs a part of the separated codes to the prediction parameter decoding unit 302. For example, a part of the separated codes includes a prediction mode predMode, a PU split mode part_mode, a merge flag merge_flag, a merge index merge_idx, an inter prediction indicator inter_pred_idc, a reference picture index refIdxLX, a prediction vector index mvp_LX_idx, and a difference vector mvdLX. Which code is to be decoded is controlled based on an indication of the prediction parameter decoding unit 302. The entropy decoding unit 301 outputs quantization coefficients to the inverse quantization and inverse transform processing unit 311. These quantization coefficients are coefficients obtained by performing a frequency transform such as a Discrete Cosine Transform (DCT), a Discrete Sine Transform (DST), or a Karyhnen Loeve Transform (KLT) on residual signals to quantize the signals in coding processing.

The inter prediction parameter decoding unit 303 decodes an inter prediction parameter with reference to a prediction parameter stored in the prediction parameter memory 307, based on a code input from the entropy decoding unit 301.

The inter prediction parameter decoding unit 303 outputs a decoded inter prediction parameter to the prediction image generation unit 308, and also stores the decoded inter prediction parameter in the prediction parameter memory 307.

The intra prediction parameter decoding unit 304 decodes an intra prediction parameter with reference to a prediction parameter stored in the prediction parameter memory 307, based on a code input from the entropy decoding unit 301. The intra prediction parameter is a parameter used in processing to predict a CU in one picture, for example, an intra prediction mode IntraPredMode. The intra prediction parameter decoding unit 304 outputs a decoded intra prediction parameter to the prediction image generation unit 308, and also stores the decoded intra prediction parameter in the prediction parameter memory 307.

The loop filter 305 applies a filter such as a deblocking filter, a Sample Adaptive Offset (SAO), and an Adaptive Loop Filter (ALF) on a decoded image of a CU generated by the addition unit 312.

The reference picture memory 306 stores a decoded image of the CU generated by the addition unit 312 at a predetermined position for each subpicture that is a decoding target and each CU.

The prediction parameter memory 307 stores a prediction parameter at a predetermined position for each picture that is a decoding target, and a prediction unit (or a subblock, a fixed size block, or a pixel). Specifically, the prediction parameter memory 307 stores an inter prediction parameter decoded by the inter prediction parameter decoding unit 303, an intra prediction parameter decoded by the intra prediction parameter decoding unit 304 and a prediction mode predMode separated by the entropy decoding unit 301. For example, stored inter prediction parameters include a prediction list use flag predFlagLX (inter prediction indicator inter_pred_idc), a reference picture index refIdxLX, and a motion vector mvLX.

The prediction image generation unit 308 receives input of a prediction mode predMode from the entropy decoding unit 301 and a prediction parameter from the prediction parameter decoding unit 302. In addition, the prediction image generation unit 308 reads a reference picture from the reference picture memory 306. The prediction image generation unit 308 generates a prediction image of a PU or a subblock by using input prediction parameters and the read reference picture (a reference picture block) in a prediction mode indicated by the prediction mode predMode.

Here, in a case that the prediction mode predMode indicates an inter prediction mode, the inter prediction image generation unit 309 generates a prediction image of a PU or a subblock through an inter prediction using inter prediction parameters input from the inter prediction parameter decoding unit 303 and the read reference picture (reference picture block).

For a reference picture list (an L0 list or an L1 list) of which the prediction list use flag predFlagLX is 1, the inter prediction image generation unit 309 reads a reference picture block that is present at a position indicated by a motion vector mvLX with reference to the PU, which is a decoding target, in the reference picture indicated by the reference picture index refIdxLX from the reference picture memory 306. The inter prediction image generation unit 309 performs a prediction based on a read reference picture block and generates a prediction image of the PU. The inter prediction image generation unit 309 outputs the generated prediction image of the PU to the addition unit 312. Here, the reference picture block is a set of pixels (generally referred to as a block due to its rectangular shape) of a reference picture and is an area to be used for generating a prediction image of a PU or a subblock.

In a case that the prediction mode predMode indicates an intra prediction mode, the intra prediction image generation unit 310 performs an intra prediction by using an intra prediction parameter input from the intra prediction parameter decoding unit 304 and a read reference picture.

The intra prediction image generation unit 310 outputs the generated prediction image of the PU to the addition unit 312.

The inverse quantization and inverse transform processing unit 311 performs inverse quantization on a quantization coefficient input from the entropy decoding unit 301 to calculate a transform coefficient. The inverse quantization and inverse transform processing unit 311 performs an inverse frequency transform such as an inverse DCT, an inverse DST, or an inverse KLT on the calculated transform coefficient to calculate a residual signal. The inverse quantization and inverse transform processing unit 311 outputs the calculated residual signal to the addition unit 312.

The addition unit 312 generates a decoded image of a PU by adding a prediction image of the PU input from the inter prediction image generation unit 309 or the intra prediction image generation unit 310 to a residual signal input from the inverse quantization and inverse transform processing unit 311 for each pixel. The addition unit 312 stores the generated decoded image of a PU in the reference picture memory 306, and outputs a decoded image Td where the generated decoded image of the PU is integrated for each picture to the outside.

Configuration of Coding Stream Extraction Apparatus

Figure 7:
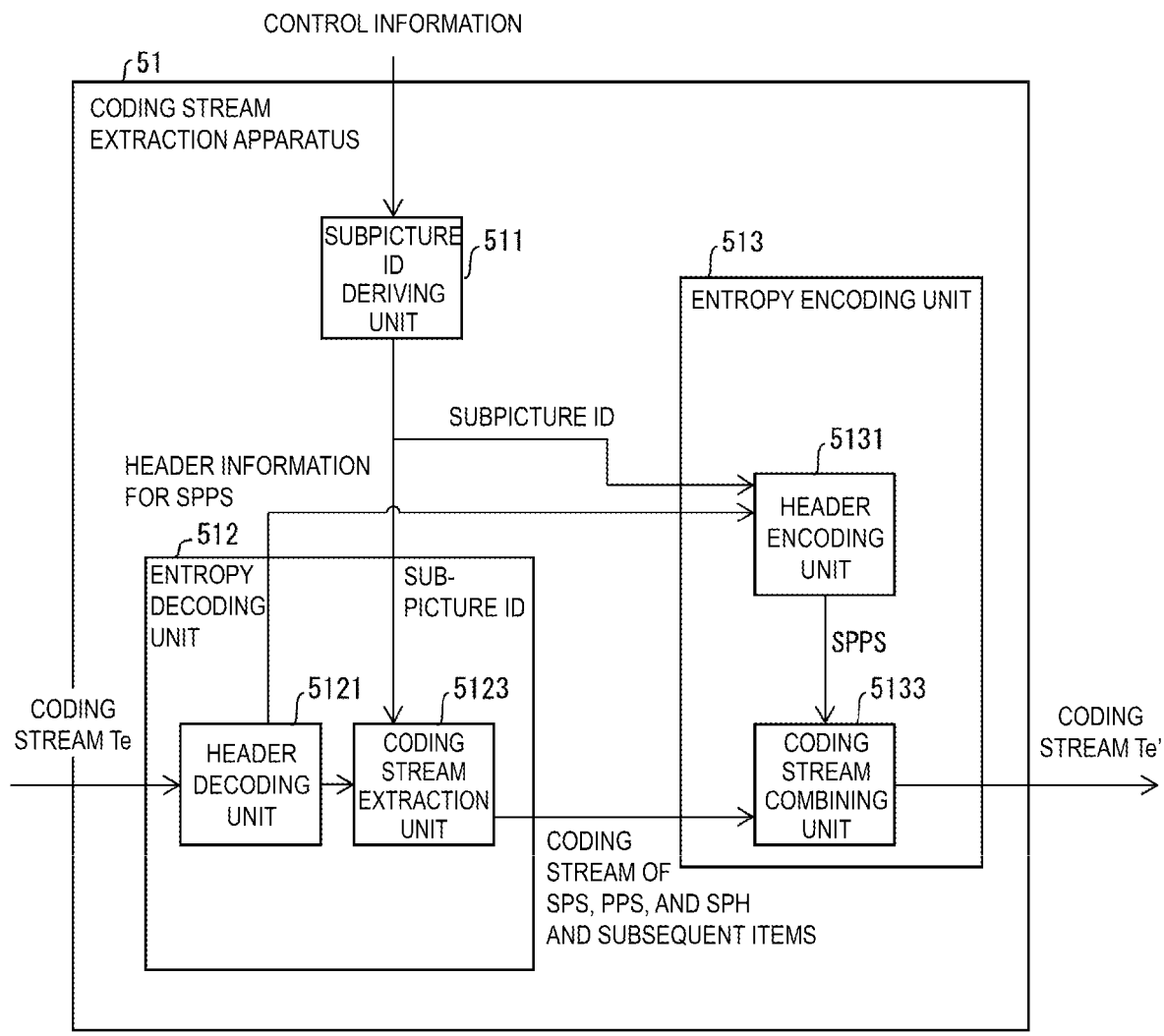
FIG. 7 is a block diagram illustrating the configuration of a coding stream extraction apparatus according to an embodiment of the present invention.

Next, the configuration of the coding stream extraction apparatus 51 according to an embodiment of the present invention will be disclosed. FIG. 7 is a block diagram illustrating the configuration of a coding stream extraction apparatus 51.

The coding stream extraction apparatus 51 generates a coding stream Te' (output coded data) from the coding stream Te (input coded data) generated by the image coding apparatus 11. As illustrated in FIG. 7, the coding stream extraction apparatus 51 includes a subpicture ID deriving unit 511, an entropy decoding unit 512, and an entropy encoding unit (an encoding unit) 513.

Subpicture ID Deriving Unit 511

The subpicture ID deriving unit 511 receives control information that indicates a partial area of the entire picture selected by a user. For example, the subpicture ID deriving unit 511 may be configured to be able to receive the area designated by a user's selection operation from the image decoding apparatus 31 or the image display apparatus 41. The image decoding apparatus 31 or the image display apparatus 41 outputs the control information disclosed previously to the subpicture ID deriving unit 511. The subpicture ID deriving unit 511 derives an ID of a subpicture including the area from the control information disclosed previously.

Figure 8:
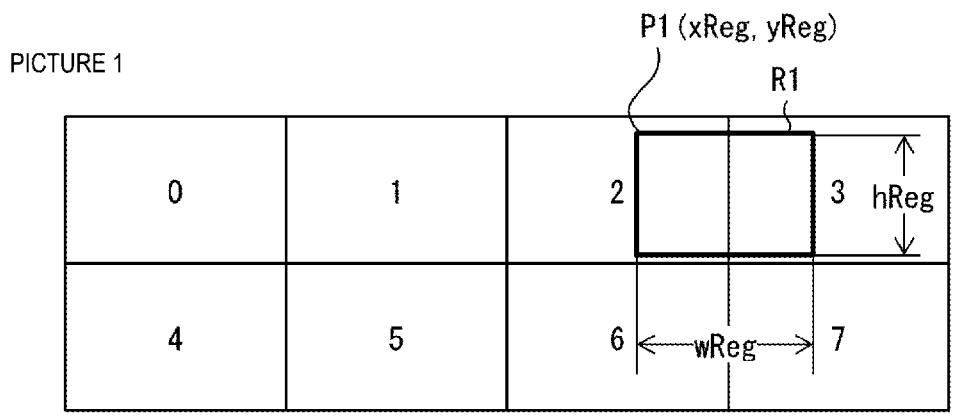
FIG. 8 is a diagram illustrating an area selected by a user in a whole picture according to an embodiment of the present invention.

This will be explained in more detail with reference to FIG. 8. FIG. 8 is a diagram illustrating of an area R1 selected by a user in a whole picture. In the example illustrated in FIG. 8, upper left coordinates of the area R1 are P1 (xReg, yReg). In addition, a width of the area R1 is wReg, and a height of the area R1 is hReg. The control information indicates the upper left coordinates P1 (xReg, yReg) of the area R1, the width wReg of the area R1, and the height hReg of the area R1.

The subpicture ID deriving unit 511 derives a subpicture ID including the area selected by the user based on the control information received from the image decoding apparatus 31 or the image display apparatus 41. For example, in the example illustrated in FIG. 8, the area R1 selected by the user is included in subpictures 2 and 3. For this reason, the subpicture ID deriving unit 511 derives subpicture IDs of the subpictures 2 and 3.

The subpicture ID deriving unit 511 outputs the derived subpicture IDs to the coding stream extraction unit 5123 of the entropy decoding unit 512 and the header encoding unit 5131 of the entropy encoding unit 513.

The image decoding apparatus 31 or the image display apparatus 41 that has received a user's selection operation may be configured to derive subpicture IDs of subpictures including an area selected by the user. In such a case, the image decoding apparatus 31 or the image display apparatus 41 transmits the subpicture IDs to the coding stream extraction apparatus 51. For this reason, the subpicture ID deriving unit 511 is unnecessary.

Entropy Decoding Unit 512

The entropy decoding unit 512 decodes coded data of a part of the coding streams Te. As illustrated in FIG. 7, the entropy decoding unit 512 includes a header decoding unit 5121 and a coding stream extraction unit 5123.

The header decoding unit 5121 decodes a part of header information (header information for the SPPS) that is necessary for generation of the subpicture parameter set SPPS in the coded data input from the image coding apparatus 11. The header decoding unit 5121 outputs a coding stream of the SPS, the PPS and the SPH and subsequent items to the coding stream extraction unit 5123. In addition, the header decoding unit 5121 outputs the header information for the SPPS that has been decoded to the header encoding unit 5131.

The coding stream extraction unit 5123 extracts a coding stream (SPH and coded data of the SPH and subsequent items) of a subpicture corresponding to the received subpicture ID. Alternatively, a coding stream of a subpicture that does not correspond to the subpicture ID is deleted from the coding stream Te. The coding stream extraction unit 5123 outputs the header information and the coding stream of the extracted subpicture to a coding stream combining unit 5133 of the entropy encoding unit 513.

Entropy Encoding Unit 513

The entropy encoding unit 513 encodes the coding stream Te'. As illustrated in FIG. 7, the entropy encoding unit 513 includes a header encoding unit 5131 and the coding stream combining unit 5133.

The header encoding unit 5131 (a subpicture parameter set generation unit) generates a subpicture parameter set SPPS in accordance with a received subpicture ID. The header encoding unit 5131 encodes the subpicture parameter set SPPS including a list of subpicture IDs. The header encoding unit 5131 outputs the coding subpicture parameter set SPPS to the coding stream combining unit 5133.

The coding stream combining unit 5133 generates coded data that includes a subpicture parameter set SPPS including one or a plurality of pieces of subpicture identification information (subpicture IDs) and image data for each of subpictures corresponding to the above-disclosed subpicture IDs. In more details, the coding stream combining unit 5133 generates the coding stream Te' as follows: In other words, the header information received from the coding stream extraction unit 5123 and the coding stream of each of the subpictures and the subpicture parameter set SPPS received from the header encoding unit 5131 are combined.

Figure 17:
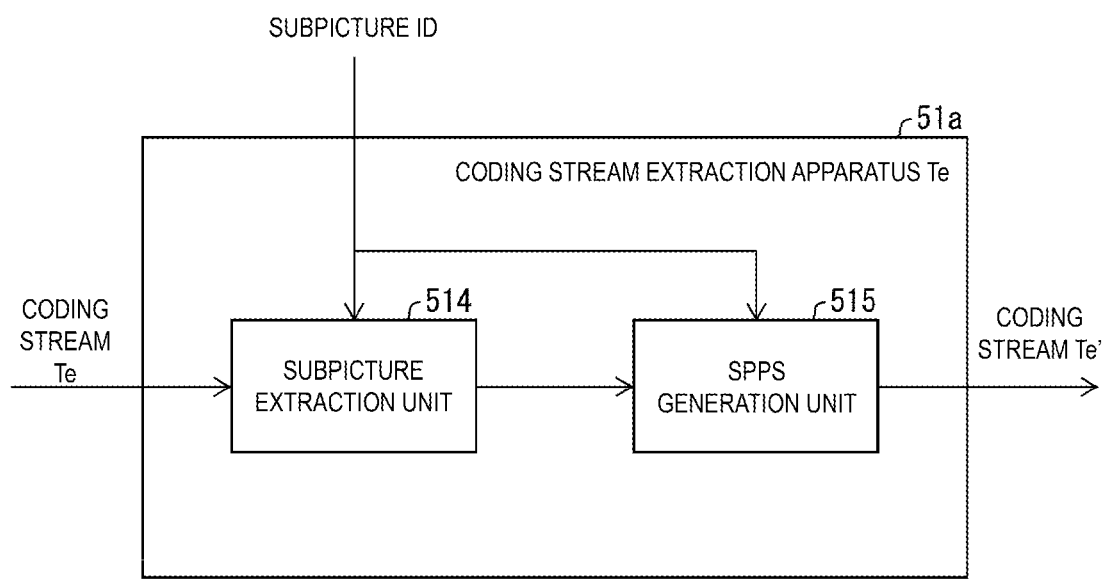
FIG. 17 is a block diagram illustrating the configuration of a coding stream extraction apparatus according to an embodiment of the present invention.

Alternatively, the configuration of the coding stream extraction apparatus 51 according to an embodiment of the present invention may be a configuration illustrated in FIG. 17. FIG. 17 is a block diagram illustrating the configuration of a coding stream extraction apparatus 51a according to an embodiment of the present invention. The coding stream extraction apparatus 51a illustrated in FIG. 17 can replace the coding stream extraction apparatus 51 illustrated in FIG. 7. As illustrated in FIG. 17, the coding stream extraction apparatus 51a includes a subpicture extraction unit 514 and an SPPS generation unit 515. It is assumed that a subpicture ID derived from the control information by an external device is input to the coding stream extraction apparatus 51a. The subpicture extraction unit 514 extracts a coding stream (the SPH and the coded data of the SPH and subsequent items) of a subpicture corresponding to the received subpicture ID from the coding stream Te. Alternatively, a coding stream of a subpicture that does not correspond to the subpicture ID is deleted from the coding stream Te. The SPPS generation unit 515 generates a subpicture parameter set SPPS from the received subpicture ID. Then, the SPPS generation unit 515 generates a coding stream Te' by combining the SPPS and the coding stream of the subpicture extracted by the subpicture extraction unit 514.

Figure 18:
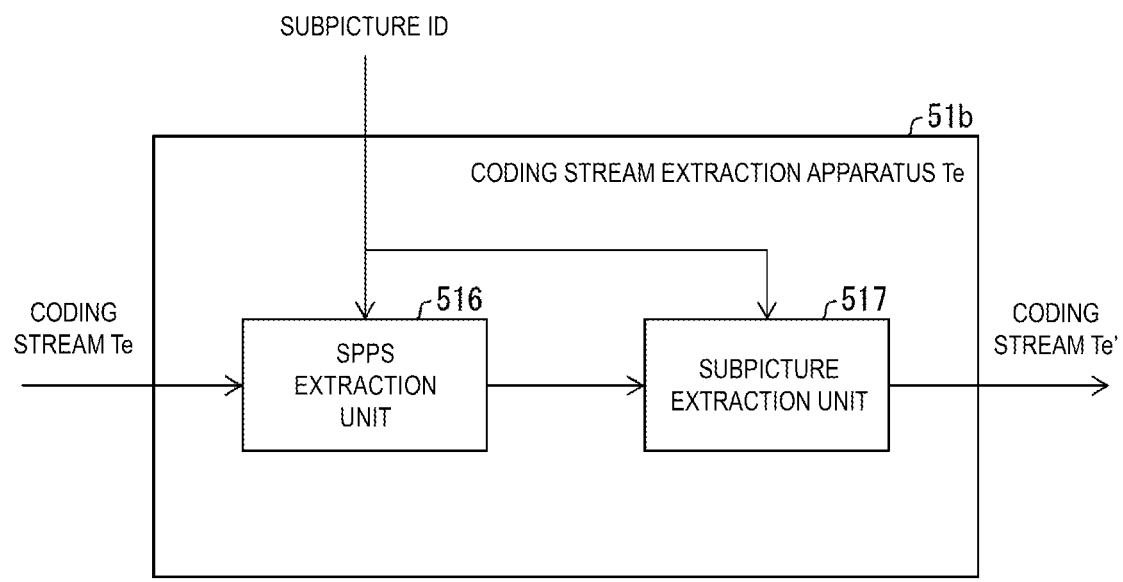
FIG. 18 is a block diagram illustrating the configuration of a coding stream extraction apparatus according to an embodiment of the present invention.

Alternatively, the configuration of the coding stream extraction apparatus 51 according to an embodiment of the present invention may be a configuration illustrated in FIG. 18. FIG. 18 is a block diagram illustrating the configuration of a coding stream extraction apparatus 51b according to an embodiment of the present invention. The coding stream extraction apparatus 51b illustrated in FIG. 18 can replace the coding stream extraction apparatus 51 illustrated in FIG. 7. As illustrated in FIG. 18, the coding stream extraction apparatus 51b includes an SPPS extraction unit 516 and a subpicture extraction unit 517. It is assumed that a subpicture ID derived from the control information by an external device is input to the coding stream extraction apparatus 51b. Differently from the coding stream extraction apparatuses illustrated in FIGS. 7 and 17, a plurality of subpicture parameter sets are included in advance in a coding stream Te input to the coding stream extraction apparatus 51b illustrated in FIG. 18. The SPPS extraction unit 516 extracts an SPPS corresponding to the received subpicture ID from the coding stream Te. Alternatively, the SPPS extraction unit 516 deletes an SPPS that does not correspond to the received subpicture ID from the coding stream Te. Similar to the subpicture extraction unit 514, the subpicture extraction unit 517 extracts coded data of a subpicture corresponding to the received subpicture ID. In addition, the subpicture extraction unit 517 generates a coding stream Te' by combining the SPPS output by the SPPS extraction unit 516 and coded data of the extracted subpicture.

Figure 19:
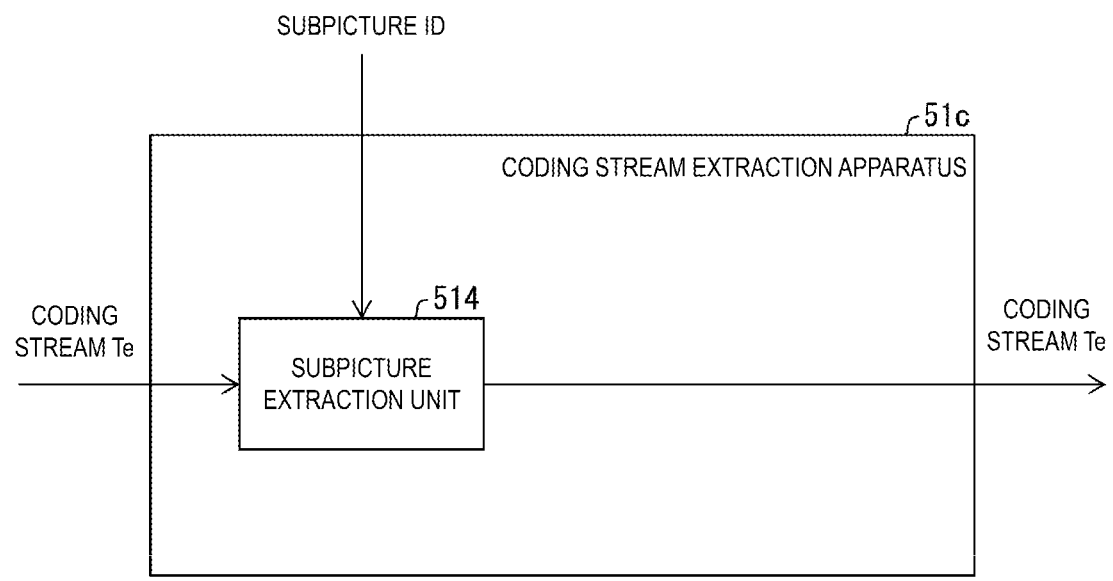
FIG. 19 is a block diagram illustrating the configuration of a coding stream extraction apparatus according to an embodiment of the present invention.

Alternatively, the configuration of the coding stream extraction apparatus 51 according to an embodiment of the present invention may be a configuration illustrated in FIG. 19. FIG. 19 is a block diagram illustrating the configuration of a coding stream extraction apparatus 51c according to an embodiment of the present invention. The coding stream extraction apparatus 51c illustrated in FIG. 19 can replace the coding stream extraction apparatus 51 illustrated in FIG. 7. As illustrated in FIG. 19, the coding stream extraction apparatus 51c is composed of a subpicture extraction unit 514. The subpicture extraction unit 514 extracts a coding stream of a subpicture corresponding to the received subpicture ID. Alternatively, a coding stream of a subpicture that does not correspond to the subpicture ID is deleted from the coding stream Te. Then, a coding stream Te' is generated.

Picture and Subpicture

There may be one or more pictures according to an embodiment of the present invention in the coded data. The picture is composed of one or more subpictures. As disclosed previously, FIG. 4 is a diagram illustrating an example of a picture having subpictures according to an embodiment of the present invention as constituent units. FIG. 4 illustrates a relation between a picture and a subpicture according to an embodiment of the present invention. FIG. 4 illustrates an example in which there are three pictures including picture 1, picture 2, and picture 3 in coded data. The picture 1 is composed of subpictures 0 to 7, and the picture 2 is composed of subpictures 0, 1, 4, and 5. The picture 2 is composed of subpictures 3 and 7.

Information indicating which subpictures a specific picture is composed of is transmitted and accumulated using a subpicture parameter set SPPS. There may be one or more subpicture parameter sets SPPS in the coded data. A picture is disclosed for each subpicture parameter set SPPS, and N pictures are disclosed in a case that N subpicture parameter sets SPPS are included in the coded data.

A subpicture may be composed of one slice, or, as illustrated in FIG. 4, a subpicture may be composed of a plurality of sub-areas (for example, tiles or slices).

Subpicture Parameter Set SPPS

Here, the subpicture parameter set SPPS generated by the header encoding unit 5131 will be disclosed. The subpicture parameter set SPPS includes information indicating which subpictures a picture included in the coding stream Te' is composed of. More specifically, the subpicture parameter set SPPS may include information used for identifying subpictures constituting the picture (subpicture identifiers). For example, the subpicture parameter set SPPS may include a list of the subpicture identifiers included_subpic_id[ ] indicating subpictures. In addition, the subpicture parameter set SPPS may include a size of each subpicture subpic_size and a size of a picture pic_size composed of subpictures. The NAL decoding unit 32 may decode the information (the subpicture identifier) used for identifying a subpicture constituting the picture, the picture size, and the subpicture size from the coding stream Te'. In addition, the header encoding unit 5131 may encode the information (the subpicture identifier) used for identifying a subpicture constituting the picture, the picture size, and the subpicture size.

Here, it is assumed that each of the picture 1, the picture 2, and the picture 3 illustrated in FIG. 4 are disclosed using subpicture parameter sets SPPS1, SPPS2, and SPPS3, and the subpicture parameter set SPPS will be disclosed subsequently.

The subpicture parameter set SPPS1 corresponding to the picture 1 illustrated in FIG. 4, for example, includes the following information.

pic_size=4096×2048
subpic_size=1024×1024
included_subpic_id[ ]={0, 1, 2, 3, 4, 5, 6, 7}

Here, pic_size indicates the size of the picture 1. In addition, subpic_size indicates the size of a subpicture. These are configured by referring to the header information for the SPPS that is output from the header decoding unit 5121. The information indicating the size of a picture and a subpicture to which a slice belongs may not be included in the slice data. In addition, the image decoding apparatus 31 may decode coded data corresponding to the partial area disclosed previously by referring to the subpicture size and the picture size included in the subpicture parameter set SPPS. The subpicture size may be restricted to be the same for all the subpictures.

included_subpic_id[ ] indicates a list of subpicture identification information (subpicture IDs) of subpictures constituting a coded picture transmitted using the coding stream Te'. This subpicture ID may be output by the subpicture ID deriving unit 511.

In the subpicture parameter set SPPS1 corresponding to the picture 1, included_subpic_id[ ]={0, 1, 2, 3, 4, 5, 6, 7}. For this reason, the subpicture parameter set SPPS1 designates subpictures corresponding to the subpicture identification information 0, 1, 2, 3, 4, 5, 6, and 7. The subpicture identification information of the subpicture may be designated using the subpicture header.

The configuration of the subpicture parameter set SPPS2 corresponding to the picture 2 illustrated in FIG. 4 is pic_size=2048×2048, subpic_size=1024×1024, and included_subpic_id[ ]={0, 1, 4, 5}.

As disclosed previously, in the subpicture parameter set SPPS2 corresponding to the picture 2, included_subpic_id[ ]={0, 1, 4, 5}. In other words, the subpicture parameter set SPPS2 designates the subpictures 0, 1, 4, and 5. In the picture 2, pic_size=2048×2048.

The configuration of the subpicture parameter set SPPS3 corresponding to the picture 3 illustrated in FIG. 4 is pic_size=1024×2048, subpic_size=1024×1024, and included_subpic_id [ ]={3, 7}.

As disclosed previously, in the subpicture parameter set SPPS3 corresponding to the picture 3, included_subpic_id[ ]={3, 7}. In other words, the subpicture parameter set SPPS3 designates subpictures 3 and 7. In the picture 3, pic_size=1024×2048.

Figure 9:
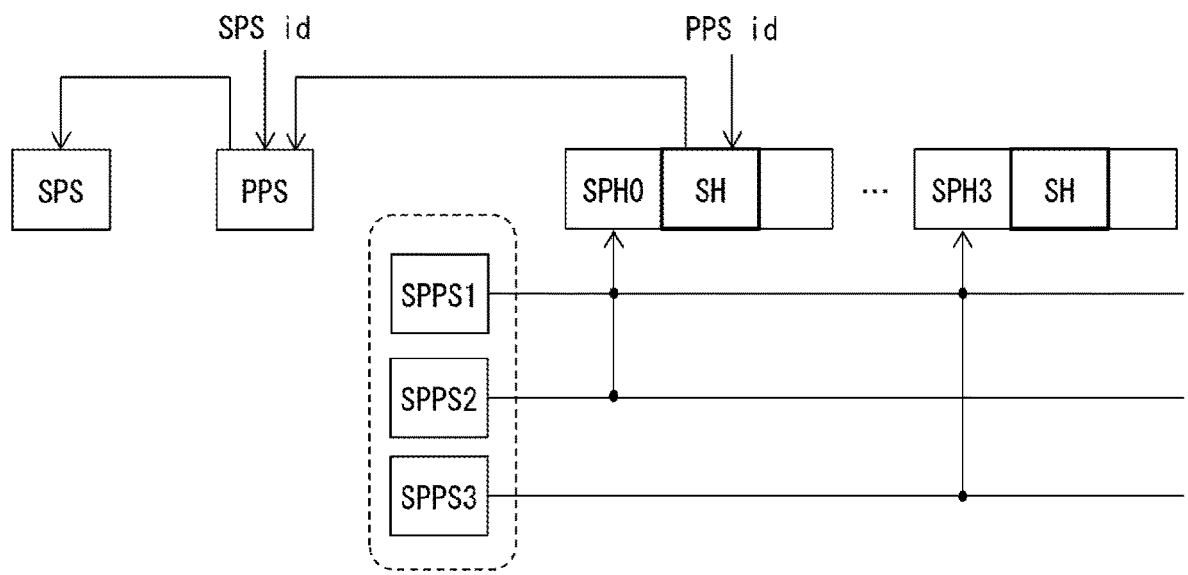
FIG. 9 is a schematic diagram illustrating an example of the configuration of a coding stream according to an embodiment of the present invention.

FIG. 9 is a schematic diagram illustrating an example of the configuration of a coding stream Te' according to an embodiment of the present invention. As illustrated in FIG. 9, a slice header SH includes a PPS id of a corresponding picture parameter set PPS. In other words, the slice header SH has a link to the corresponding picture parameter set PPS. The picture parameter set PPS includes an SPS id of the corresponding sequence parameter set SPS. In other words, the picture parameter set PPS has a link to the corresponding sequence parameter set SPS.

On the other hand, information indicating a corresponding subpicture parameter set SPPS is not included in the slice header SH. Therefore, in a case that the relation between the slice and the subpicture parameter set SPPS is changed, the slice header SH does not need to be rewritten. In other words, there is an effect that rewriting of slices is unnecessary even in a case that coded data is extracted, and the definition of the picture is changed.

Furthermore, one slice may be associated with a plurality of subpicture parameter sets SPPS. In accordance with this, there is an effect that a specific area (a set of slices or subpictures) can be freely associated with each picture by defining a plurality of pictures (subpicture parameter sets SPPS).

As disclosed previously, the subpicture parameter set SPPS designates a corresponding subpicture header SPH. In other words, the subpicture parameter set SPPS has a link to a subpicture (included_subpic_id[ ] disclosed previously). In this case, the definition of the picture (the subpicture) can be rewritten by only rewriting the link of the subpicture parameter set SPPS, in other words, included_subpic_id[ ]. Apparently, also in this case, slices do not need to be rewritten. Then, a slice following the subpicture header SPH is a slice that belongs to the subpicture designated by the SPPS.

For example, subpictures 0 and 3 are included in the picture 1. For this reason, as illustrated in FIG. 9, a subpicture parameter set SPPS1 corresponding to the picture 1 designates a subpicture header SPH0 corresponding to the subpicture 0 and a subpicture header SPH3 corresponding to the subpicture 3.

In the picture 2, the subpicture 0 is included, and the subpicture 3 is not included. For this reason, as illustrated in FIG. 9, the subpicture parameter set SPPS2 corresponding to the picture 2 designates a subpicture header SPH0 corresponding to the subpicture 0. The subpicture parameter set SPPS2 does not designate the subpicture header SPH3 corresponding to the subpicture 3.

In addition, in the picture 3, the subpicture 0 is not included, and the subpicture 3 is included. For this reason, as illustrated in FIG. 9, the subpicture parameter set SPPS3 corresponding to the picture 3 does not designate the subpicture header SPH0 corresponding to the subpicture 0. In addition, the subpicture parameter set SPPS3 designates a subpicture header SPH3 corresponding to the subpicture 3.

Transmission of Subpicture Parameter Set SPPS

The subpicture parameter set SPPS may be configured to be transmitted by the NAL unit. For example, nal_unit_type of nal_unit_header ( ) may be disclosed as follows.

nal_unit_type=41 SPPS_NUT subpicture parameter set
nal_unit_type=42 SPH_NUT subpicture header Here, a syntax equal to or less than pic_size or a subpicture ID may be stored in rbsp_byte.

According to the above-disclosed configuration, the coding stream extraction apparatus 51 generates a subpicture parameter set SPPS including one or a plurality of pieces of subpicture identification information (subpicture IDs). In other words, the coding stream extraction apparatus 51 can generate a subpicture parameter set indicating a combination of subpictures included in the coding stream Te'. For this reason, coded data corresponding to a partial area of input coded data designated by the user can be newly generated with a small amount of processing. In addition, the coding stream extraction apparatus 51 can generate a subpicture parameter set indicating a combination of subpictures corresponding to the partial area.

In this way, the image decoding apparatus 31 can decode only an area desired by a user and display video having a small delay due to transmission and processing in the image display apparatus 41. In addition, the coding stream extraction apparatus 51 transmits required minimum coded data and can inhibit a load applied to traffics in a transmission path to be minimal.

Alternatively, in a case that the coding stream extraction apparatus 51 generates coded data by combining extracted subpictures, slice addresses and CTU addresses do not need to be corrected, and subpictures can be cut out and combination with a small processing load.

Modified Example of Subpicture Parameter Set SPPS

Next, a modified example of the subpicture parameter set SPPS will be disclosed. A subpicture parameter set SPPS according to this modified example includes at least one of a subpicture profile and a level.

In other words, the header encoding unit 5131 generates a profile disclosed using a set of coding tools such that it is included in the subpicture parameter set disclosed previously. The header encoding unit 5131 generates a level indicating an image size such that it is included in the subpicture parameter set disclosed previously. Such profiles and level information are configured by referring to the header information for the SPPS and the like output by the header decoding unit 5121.

For example, the header encoding unit 5131 may include information indicating the subpicture level and the profile as disclosed subsequently in the above-disclosed subpicture parameter sets SPPS1 to SPPS3.

Subpicture parameter set SPPS1
profile=Main10, level=4.1 pic_size=4096×2048
Subpicture parameter set SPPS2
profile=Main10, level=3
pic_size=2048×2048
Subpicture parameter set SPPS3
Profile=Main10, level=2
pic_size=1024×2048

According to the above-disclosed configuration, a profile disclosed by a set of coding tools necessary for decoding subpictures can be presented for the image decoding apparatus 31.

In addition, according to the previously disclosed configuration, the image decoding apparatus 31 can indicate a level indicating an image size required for decoding a subpicture.

For example, in an image decoding apparatus having a decoding capacity lower than an image decoding apparatus capable of decoding an entire picture, by referring to the profile and the level disclosed previously, it can be determined whether or not the decoding of a picture or a subpicture can be handled.

Process of Generating Coding Stream Te'

Figure 10:
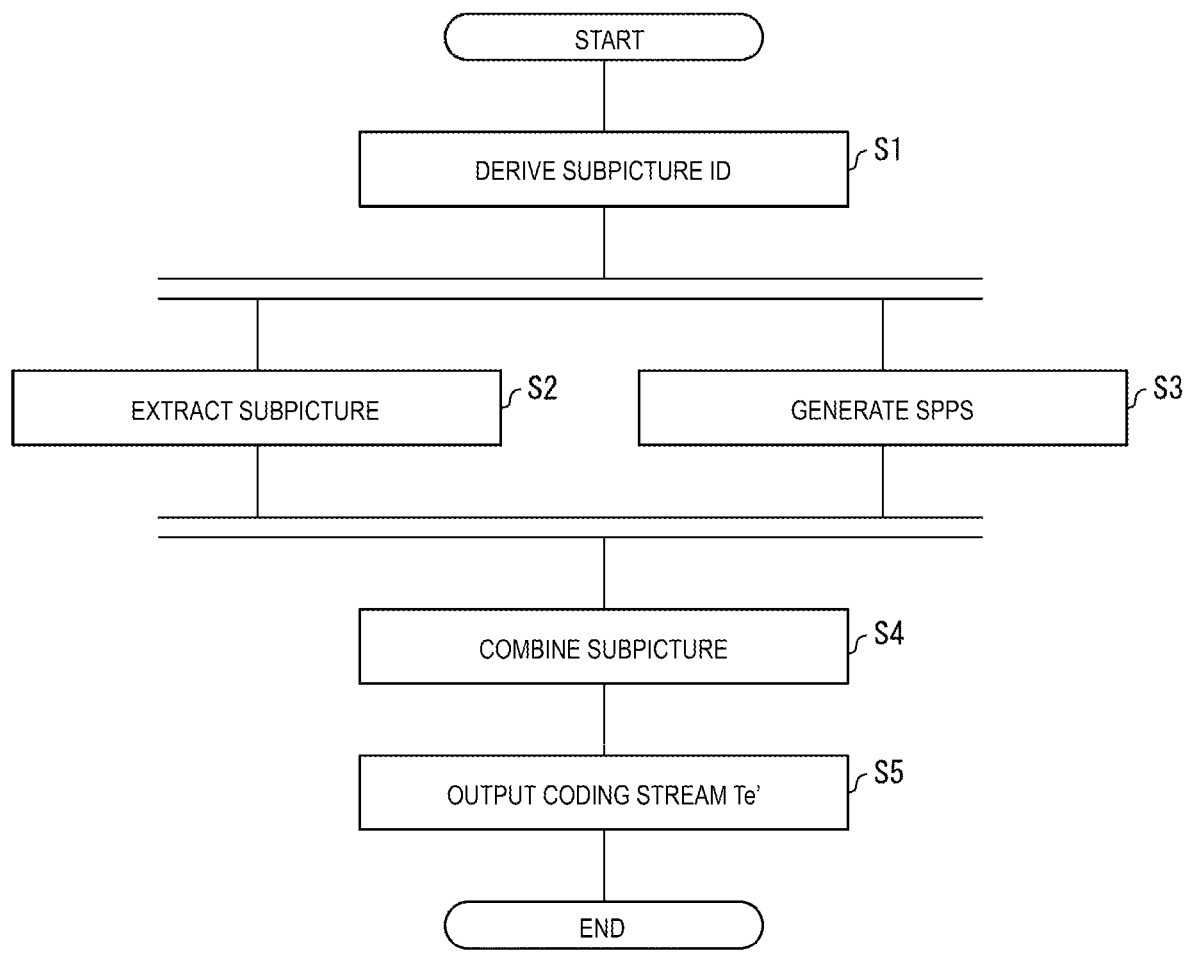
FIG. 10 is a flowchart illustrating a method of a coding stream extraction apparatus according to an embodiment of the present invention generating a coding stream Te'.

Next, a process of the coding stream extraction apparatus 51 generating a coding stream Te' will be disclosed. FIG. 10 is a flowchart illustrating a method of an example of the flow of the process of generating a coding stream Te'.

As illustrated in FIG. 10, the subpicture ID deriving unit 511 derives IDs of subpictures including an area designated by a user from control information corresponding to the area designated by the user (S1). As illustrated in FIG. 4, a picture 3 is composed of subpictures 3 and 7. In a case that an area included in the picture 3 is designated by a user, the subpicture ID deriving unit 511 derives subpicture IDs of the subpicture 3 and the subpicture 7.

Subsequently, the coding stream extraction unit 5123 extracts coded data of subpictures corresponding to the subpicture IDs received from the subpicture ID deriving unit 511 (S2).

In parallel with S2, the header encoding unit 5131 generates subpicture parameter sets SPPS in accordance with the received subpicture IDs and the header information for the SPPS (S3).

Subsequently, the coding stream combining unit 5133 generates a coding stream Te' by combining the header information, the coding stream of each subpicture, and the subpicture parameter sets SPPS (S4).

Subsequently, the coding stream combining unit 5133 outputs the generated coding stream Te' to the image decoding apparatus 31 (S5).

FIG. 11 is a diagram illustrating a coding stream Te' generated by a coding stream extraction apparatus 51 according to an embodiment of the present invention. FIG. 11 illustrates an example of a coding stream Te' generated by the coding stream extraction apparatus 51 in a case that a user designates an area included in the picture 3 illustrated in FIG. 4. As illustrated in FIG. 11, the coding stream Te' includes a sequence parameter set SPS and a picture parameter set PPS, a subpicture parameter set SPPS3 corresponding to the picture 3; a subpicture header SPH3 corresponding to subpicture 3, a coding subpicture 3 (SPICT3), a subpicture header SPH7 corresponding to a subpicture 7, and the subpicture 7 (SPICT7).

Supplemental Note

Parts of the image coding apparatus 11 and the image decoding apparatus 31 according to the above-disclosed embodiments, for example, the entropy decoding unit 301, the prediction parameter decoding unit 302, the loop filter 305, the prediction image generation unit 308, the inverse quantization and inverse transform processing unit 311, the addition unit 312, the prediction image generation unit 101, the subtraction unit 102, the transform and quantization processing unit 103, the entropy encoding unit 104, the inverse quantization and inverse transform processing unit 105, the loop filter 107, the coding parameter determination unit 110, and the prediction parameter encoding unit 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the image coding apparatus 11 or the image decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-disclosed program may be one for realizing some of the above-disclosed functions, and also may be one capable of realizing the above-disclosed functions in combination with a program already recorded in a computer system.

A part or all of the image coding apparatus 11 and the image decoding apparatus 31 according to the embodiments disclosed previously may be realized as an integrated circuit such as a Large-Scale Integration (LSI). Each function block of the image coding apparatus 11 and the image decoding apparatus 31 may be individually realized as processors, or part or all may be integrated into processors. A circuit integration technique is not limited to the LSI, and may be realized with a dedicated circuit or a general-purpose processor. Furthermore, in a case that advances in semiconductor technology lead to the advent of a circuit integration technology that replaces an LSI, an integrated circuit based on the circuit integration technology may be used.

The present invention has been disclosed in detail referring to the drawings, but the specific configuration is not limited to the disclosed embodiments and various amendments can be made to a design that fall within the scope that does not depart from the gist of the present invention.

Application Examples

The previously disclosed image coding apparatus 11 and the image decoding apparatus 31 can be utilized being installed to various apparatuses performing transmission, reception, recording, and reproduction of videos. The video may be a natural video imaged by camera or the like, or may be an artificial video (including CG and GUI) generated by computer or the like.

Figure 14:
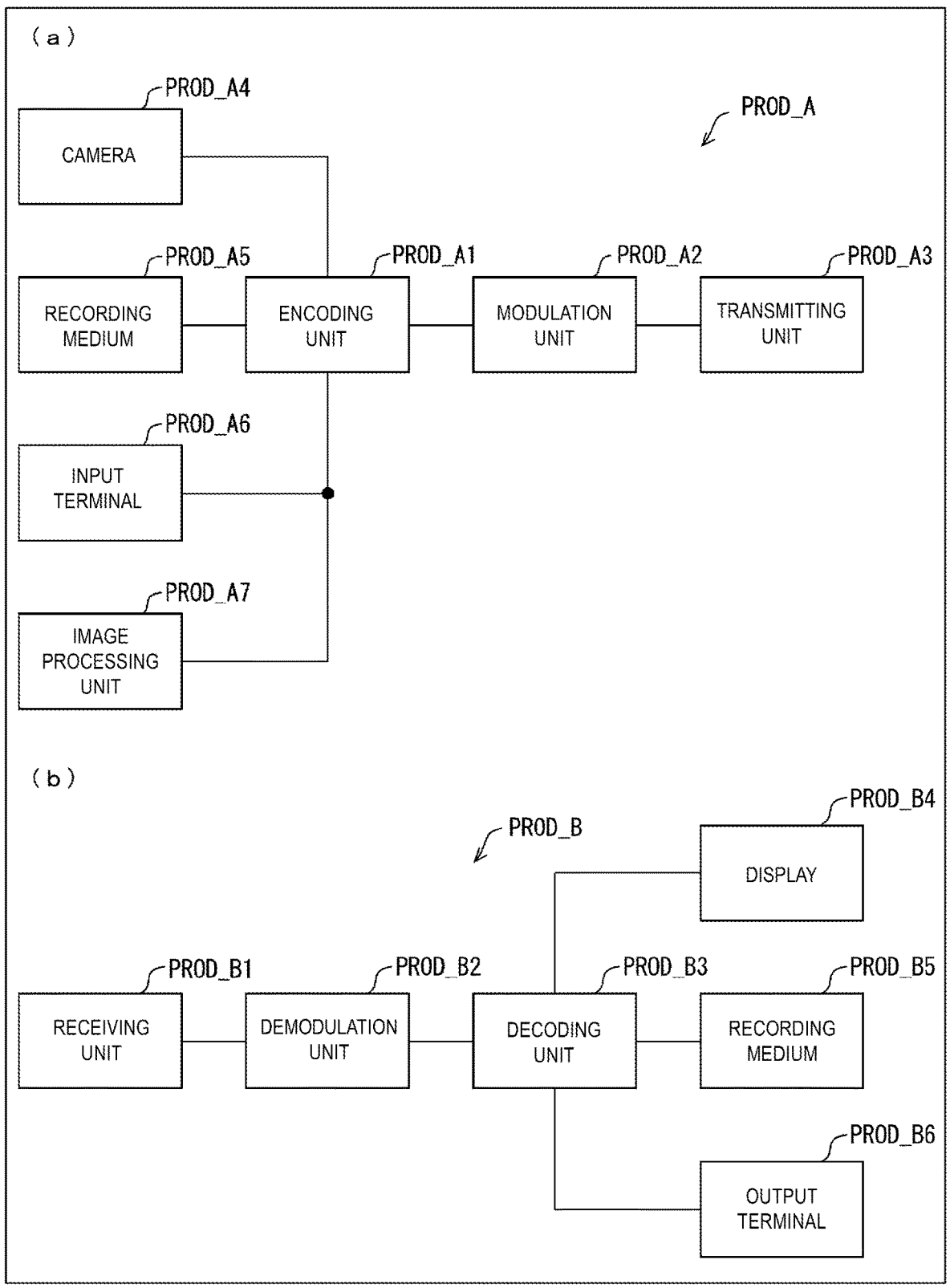
FIG. 14 is a diagram illustrating configurations of a transmitting apparatus equipped with an image coding apparatus and a receiving apparatus equipped with an image decoding apparatus according to an embodiment of the present invention.

At first, referring to FIG. 14, the previously disclosed image coding apparatus 11 and the image decoding apparatus 31 can be utilized for transmission and reception of videos.

FIG. 14(a) is a block diagram illustrating a configuration of a transmitting apparatus PROD_A installed with the image coding apparatus 11. As illustrated in FIG. 14(a), the transmitting apparatus PROD_A includes an encoding unit PROD_A1 which obtains coded data by coding videos, a modulation unit PROD_A2 which obtains modulation signals by modulating carrier waves with the coded data obtained by the encoding unit PROD_A1, and a transmitting unit PROD_A3 which transmits the modulation signals obtained by the modulation unit PROD_A2. The previously disclosed image coding apparatus 11 is utilized as the encoding unit PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the encoding unit PROD_A1. Although an example configuration in which the transmitting apparatus PROD_A includes all of the constituents is illustrated in FIG. 14(a), some of the constituents may be omitted.

Note that the recording medium PROD_A5 may record videos which are not coded or may record videos coded in a coding scheme for recording different from a coding scheme for transmission. In the latter case, a decoding unit (not illustrated) to decode coded data read from the recording medium PROD_A5 according to the coding scheme for recording may be present between the recording medium PROD_A5 and the encoding unit PROD_A1.

FIG. 14(b) is a block diagram illustrating a configuration of a receiving apparatus PROD_B installed with the image decoding apparatus 31. As illustrated in FIG. 14(b), the receiving apparatus PROD_B includes a receiving unit PROD_B1 that receives modulation signals, a demodulation unit PROD_B2 that obtains coded data by demodulating the modulation signals received by the receiving unit PROD_B1, and a decoding unit PROD_B3 that obtains videos by decoding the coded data obtained by the demodulation unit PROD_B2. The previously disclosed image decoding apparatus 31 is utilized as the decoding unit PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoding unit PROD_B3. Although an example configuration that the receiving apparatus PROD_B includes all of the constituents is illustrated in FIG. 14(b), some of the constituents may be omitted.

Note that the recording medium PROD_B5 may record videos which are not coded, or may record videos which are coded in a coding scheme for recording different from a coding scheme for transmission. In the latter case, an encoding unit (not illustrated) that encodes videos acquired from the decoding unit PROD_B3 according to the coding scheme for recording may be present between the decoding unit PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding video imaged with a camera and uploading the video to a server, in addition to a function of decoding coded data downloaded from a server and displaying on a display. Therefore, the client of the video hosting service functions as both the transmitting apparatus PROD_A and the receiving apparatus PROD_B.

Figure 15:
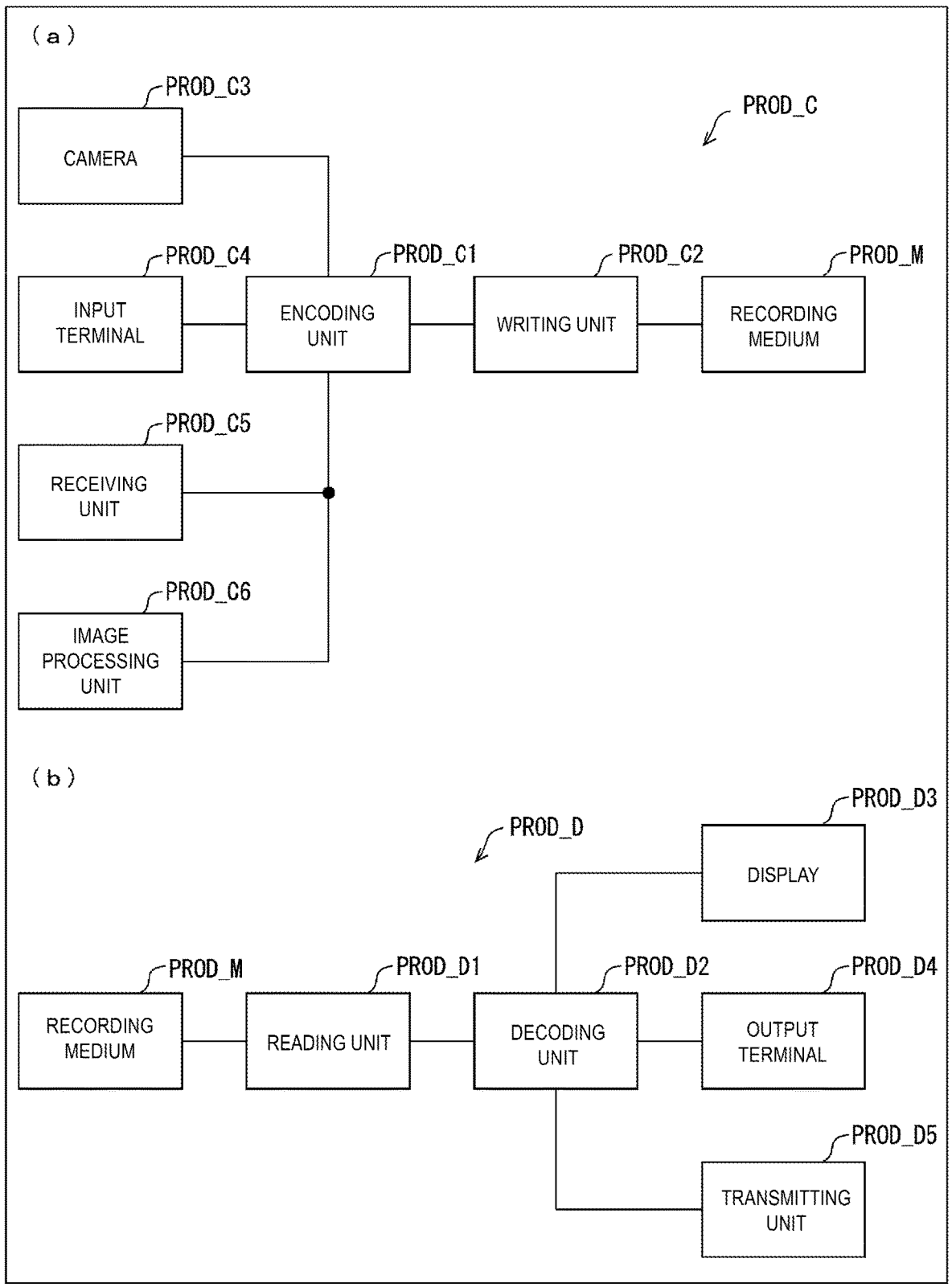
FIG. 15 is a diagram illustrating configurations of a recording apparatus equipped with an image coding apparatus and a reconstruction apparatus equipped with an image decoding apparatus according to an embodiment of the present invention.

Next, referring to FIG. 15, previously disclosed image coding apparatus 11 and the image decoding apparatus 31 can be utilized for recording and reproduction of videos.

FIG. 15(a) is a block diagram illustrating a configuration of a recording apparatus PROD_C installed with the previously disclosed image coding apparatus 11. As illustrated in FIG. 15(a), the recording apparatus PROD_C includes an encoding unit PROD_C1 that obtains coded data by coding video, and a writing unit PROD_C2 that writes the coded data obtained by the encoding unit PROD_C1 in a recording medium PROD_M. The previously disclosed image coding apparatus 11 is utilized as the encoding unit PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD) or Blu-ray Disc (BD: trade name).

In addition, the recording apparatus PROD_C may further include a camera PROD_C3 that images video, an input terminal PROD_C4 for inputting the video from the outside, a receiving unit PROD_C5 for receiving the video, and an image processing unit PROD_C6 that generates or processes images, as supply sources of the video input into the encoding unit PROD_C1. Although an example configuration that the recording apparatus PROD_C includes all of the constituents is illustrated in FIG. 15(a), some of the constituents may be omitted.

Note that the receiving unit PROD_C5 may receive video which is not coded, or may receive coded data coded in a coding scheme for transmission different from the coding scheme for recording. In the latter case, a decoding unit for transmission (not illustrated) that decodes coded data coded in the coding scheme for transmission may be present between the receiving unit PROD_C5 and the encoding unit PROD_C1.

Examples of such recording apparatus PROD_C include, for example, a DVD recorder, a BD recorder, a Hard Disk Drive (HDD) recorder, and the like (in this case, the input terminal PROD_C4 or the receiving unit PROD_C5 is the main supply source of videos). In addition, a camcorder (in this case, the camera PROD_C3 is the main supply source of videos), a personal computer (in this case, the receiving unit PROD_C5 or the image processing unit C6 is the main supply source of videos), a smartphone (in this case, the camera PROD_C3 or the receiving unit PROD_C5 is the main supply source of videos), or the like is an example of the recording apparatus PROD_C as well.

FIG. 15(b) is a block diagram illustrating a configuration of a reconstruction apparatus PROD_D installed with the previously disclosed image decoding apparatus 31. As illustrated in FIG. 15(b), the reconstruction apparatus PROD_D includes a reading unit PROD_D1 which reads coded data written in the recording medium PROD_M, and a decoding unit PROD_D2 which obtains video by decoding the coded data read by the reading unit PROD_D1. The previously disclosed image decoding apparatus 31 is utilized as the decoding unit PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays video, an output terminal PROD_D4 for outputting the video to the outside, and a transmitting unit PROD_D5 that transmits the video, as the supply destinations of the video to be output by the decoding unit PROD_D2. Although an example configuration that the reconstruction apparatus PROD_D includes all of the constituents is illustrated FIG. 15(b), some of the constituents may be omitted.

Note that the transmitting unit PROD_D5 may transmit video which is not coded or may transmit coded data coded in the coding scheme for transmission different from a coding scheme for recording. In the latter case, an encoding unit (not illustrated) that codes video in the coding scheme for transmission may be present between the decoding unit PROD_D2 and the transmitting unit PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitting unit PROD_D5 is the main supply destination of videos), a desktop PC (in this case, the output terminal PROD_D4 or the transmitting unit PROD_D5 is the main supply destination of videos), a laptop or tablet PC (in this case, the display PROD_D3 or the transmitting unit PROD_D5 is the main supply destination of videos), a smartphone (in this case, the display PROD_D3 or the transmitting unit PROD_D5 is the main supply destination of videos), or the like is an example of the reconstruction apparatus PROD_D.

Realization by Hardware and Realization by Software

Each block of the previously disclosed image decoding apparatus 31 and the image coding apparatus 11 may be realized as a hardware by a logical circuit formed on an integrated circuit (IC chip), or may be realized as a software using a Central Processing Unit (CPU).

In the latter case, each of the above-disclosed apparatuses include a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiments of the present invention can be achieved by supplying, to each of the apparatuses, the recording medium that records, in a computer readable form, program codes of a control program (executable program, intermediate code program, source program) of each of the apparatuses that is software for realizing the disclosed functions and by reading and executing, by the computer (or a CPU or a MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable Logic Device (PLD) and a Field Programmable Gate Array (FPGA), or the like can be used.

In addition, each of the apparatuses is configured to be connectable with a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a digital terrestrial broadcast network are available. Note that the embodiments of the present invention can be also realized in the form of computer data signals embedded in a carrier such that the transmission of the program codes is embodied in electronic transmission.

The embodiments of the present invention are not limited to the disclosed embodiments, and various modifications are possible within the scope of the claims. That is, an embodiment obtained by combining technical means modified appropriately within the scope of claims is included in the technical scope of the present invention as well.

CROSS-REFERENCE OF RELATED APPLICATION

This application claims the benefit of priority to Japanese Patent Application No. 2018-094031 filed on May 15, 2018, which is incorporated herein by reference in its entirety.

INDUSTRIAL APPLICABILITY

The embodiments of the present invention can be preferably applied to an image decoding apparatus that decodes coded data in which image data is encoded, and an image coding apparatus that generates coded data in which image data is encoded. The embodiments of the present invention can be preferably applied to a data structure of coded data generated by the image coding apparatus and used by the image decoding apparatus.

REFERENCE NUMERAL LIST

11 Image coding apparatus
16 NAL generating unit (coded data generating unit)
13a to 13n Subpicture encoding unit
51 Coding stream extraction apparatus
513 Entropy encoding unit (encoding unit)
31 Image decoding apparatus
33a to 33n Subpicture decoding unit (decoding unit)
36 Picture combining unit (decoding unit)

What is claimed is:

1. An image coding apparatus, comprising:
a coded data generating unit configured to:
generate coded data including image data for each subpicture in a plurality of subpictures associated with a picture, each subpicture generated by extracting a specific area of the picture;
generate, for each subpicture, a subpicture header including subpicture identification information used for distinguishing each subpicture from other subpictures in the plurality of subpictures; and
add the generated subpicture header to the coded data, wherein a first subpicture in the plurality of subpictures is to be displayed independently from the picture or the other subpictures by decoding the coded data using a subpicture header associated with the first subpicture.

2. The image coding apparatus according to claim 1, further comprising a subpicture encoding unit configured to:
initialize, for at least one subpicture, a slice address indicating a first coding tree unit (CTU) address of a slice included in the at least one subpicture;
generate a slice header including the slice address; and
include the slice header in the coded data for the subpicture.

3. A coding stream extraction apparatus that generates output coded data from input coded data, the coding stream extraction apparatus comprising:
an encoding unit configured to:
generate the output coded data, wherein the input coded data includes (i) image data for each subpicture in a plurality of subpictures associated with a picture, each subpicture generated by extracting a specific area of the picture, and (ii) a subpicture header for each subpicture, each subpicture header including subpicture identification information used for distinguishing each subpicture from other subpictures in the plurality of subpictures; and
generate the output coded data including a subpicture parameter set including one or a plurality of pieces of subpicture identification information and image data for each subpicture, wherein
a first subpicture in the plurality of subpictures is to be displayed independently from the picture or the other subpictures by decoding the output coded data using a subpicture parameter set associated with the first subpicture.

4. The coding stream extraction apparatus according to claim 3, wherein the encoding unit is further configured to add sizes of decoded data of the picture and decoded data of at least one subpicture to a subpicture parameter set associated with the at least one subpicture.

5. The coding stream extraction apparatus according to claim 4, wherein the encoding unit is further configured to add profile data defined by using a set of coding tools to the subpicture parameter set.

6. The coding stream extraction apparatus according to claim 3, wherein the encoding unit is further configured to include a level indicating a size of each subpicture in the corresponding subpicture parameter set.

7. An image decoding apparatus that decodes coded data, the image decoding apparatus comprising:
a decoding unit configured to:
generate a decoded image of a subpicture by decoding the coded data, wherein the coded data includes:
image data for the subpicture, wherein the subpicture is one of a plurality of subpictures associated with a picture, and is generated by extracting a specific area of the picture,
a subpicture header that includes subpicture identification information used for distinguishing the subpicture from other subpictures in the plurality of subpictures, and
a subpicture parameter set including one or more pieces of information associated with the subpicture; and
display the decoded image of the subpicture by using the image data for the subpicture, the subpicture parameter set, and the subpicture header included in the coded data.

8. The image decoding apparatus according to claim 7, wherein:
the coded data further includes at least one slice header including a slice address initialized for the subpicture; and
displaying the decoded image further comprises displaying the decoded image of the subpicture using the slice header including the slice address.

9. The image coding apparatus according to claim 1, wherein the subpicture header is different from a slice header associated with a slice in a plurality of slices of each subpicture, wherein the slice header includes information about each slice.

10. The coding stream extraction apparatus according to claim 3, wherein the subpicture header is different from a slice header associated with a slice in a plurality of slices of each subpicture, wherein the slice header includes information about each slice.

11. The image decoding apparatus according to claim 7, wherein the subpicture header is different from a slice header associated with a slice in a plurality of slices of each subpicture, wherein the slice header includes information about each slice.

* * * * *